United States Patent
Doy et al.

(10) Patent No.: US 11,997,561 B2
(45) Date of Patent: May 28, 2024

(54) SYSTEM AND METHOD FOR DEFINING AN AREA OF A WORKSITE

(71) Applicant: Caterpillar Paving Products Inc., Brooklyn Park, MN (US)

(72) Inventors: Nathaniel S. Doy, Maple Grove, MN (US); John L Marsolek, Watertown, MN (US); Sangameshwar Sonth, Dunlap, IL (US); Robert J. McGee, Peoria, IL (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 87 days.

(21) Appl. No.: 17/715,560

(22) Filed: Apr. 7, 2022

(65) Prior Publication Data
US 2023/0328477 A1 Oct. 12, 2023

(51) Int. Cl.
*H04W 4/021* (2018.01)
*H04W 4/029* (2018.01)
*H04W 68/00* (2009.01)

(52) U.S. Cl.
CPC ........... *H04W 4/022* (2013.01); *H04W 4/029* (2018.02); *H04W 68/00* (2013.01)

(58) Field of Classification Search
CPC ...... H04W 4/022; H04W 4/029; H04W 68/00
USPC ...................................................... 455/456.1
See application file for complete search history.

(56) References Cited

U.S. PATENT DOCUMENTS

| | | | |
|---|---|---|---|
| 7,491,014 B2 | 2/2009 | Sick | |
| 10,640,943 B2 | 5/2020 | Marsolek et al. | |
| 11,054,831 B2 | 7/2021 | O'Donnell et al. | |
| 2015/0148061 A1* | 5/2015 | Koukoumidis | H04W 4/022 455/456.1 |
| 2018/0025649 A1* | 1/2018 | Contreras | G08G 5/0069 701/3 |
| 2020/0117201 A1 | 4/2020 | Oetken et al. | |
| 2020/0314623 A1* | 10/2020 | Pellegrini | H04M 3/5116 |

FOREIGN PATENT DOCUMENTS

JP 2929369 8/1999
WO WO2020/206426 10/2020

* cited by examiner

Primary Examiner — Ted M Wang
(74) *Attorney, Agent, or Firm* — Lee & Hayes, PLLC

(57) ABSTRACT

A method includes receiving information indicative of a perimeter of a first portion of a work surface, generating, based on the information, a first geofence substantially overlaying the perimeter, and causing a display to display the first geofence. The method also includes receiving a first input indicating an accuracy of the first geofence. The method further includes determining that at least part of the first geofence is less than a threshold distance from a second geofence associated with the work surface. The method also includes generating, based on determining that the at least part of the first geofence is less than the threshold distance from the second geofence, a third geofence associated with the work surface.

20 Claims, 9 Drawing Sheets

SYSTEM AND METHOD FOR DEFINING AN AREA OF A WORKSITE

TECHNICAL FIELD

The present disclosure relates to a system and method for a defining an area of a worksite where a task is to be performed. More specifically, the present disclosure relates to a system and method for generating one or more geofences associated with a work surface of a worksite, the one or more geofences defining at least a portion of the work surface to be acted on by a machine.

BACKGROUND

Heavy duty machines are frequently employed to perform mining, paving, construction, or other tasks at a worksite. Such tasks include excavation, grading, removing a layer of material from a work surface of the worksite, compacting soil, gravel, fresh laid asphalt, or other compactable materials disposed on the work surface, and the like. For example, during construction of roadways, highways, parking lots and the like, one or more compaction machines are typically utilized to compact soil, stone, and/or recently laid asphalt. Such compaction machines, which may be self-propelling machines, travel over the work surface whereby the weight of the compaction machine compresses the surface materials to a solidified mass. In some examples, loose asphalt is deposited and spread over the work surface, and one or more additional compaction machines travel over the loose asphalt to produce a densified, rigid asphalt mat. The rigid, compacted asphalt has the strength to accommodate significant vehicular traffic and, in addition, provides a smooth, contoured surface capable of directing rain and other precipitation from the compacted surface.

To assist with performing various tasks at the worksite, a compaction machine and other heavy-duty machines may be equipped to operate in an autonomous or semi-autonomous mode in which the machine operates at least in part under computer control. In preparation for autonomous or semi-autonomous performance of a task at the worksite, the machine obtains geographical coordinates designating a boundary of a geofence associated with the work surface of the worksite. For instance, an operator located in an operator compartment of the machine, or in a back office, can control the machine to traverse a portion of the work surface, and to determine geographic coordinates of a perimeter of an area on the work surface where a geofence is to be formed. For example, such a geofence may define an internal area within which a compaction operation is to be performed by a compaction machine. In other examples, one or more rovers, drones, or other machines are employed to obtain the geographic coordinates designating the boundary of the geofence. While defining the boundary of such geofences helps to increase the efficiency of tasks performed at the worksite, inaccuracies in the location or configuration of the geofence boundary can result in portions of the work surface being acted on erroneously. Additionally, changes in the condition of the work surface over time that are not taken into account after the geofence has been generated may result in further errors in the tasks being performed on the work surface.

One method for defining a boundary for operating a machine at a worksite is described in International Patent Publication No. WO 2020/206426 ("the '426 reference"). The '426 reference describes a system for autonomous or semi-autonomous operation of a compaction vehicle that uses a machine automation portal (MAP) application to display a map of a worksite. A graphical user interface enables a user to define, on the map, a boundary of an autonomous operating zone and a boundary of one or more exclusion zones where the vehicle may not travel. However, the system described in the '426 reference does not allow an operator or other user to verify the accuracy of the boundary of the operating zone. The system described in the '426 reference also does not allow the operator or other user to modify the boundary of the operating zone once the boundary has been established. As a result, the system described in the '426 reference is not optimized for use in various construction, mining, paving, and other environments requiring the use of highly accurate and modifiable work surface boundaries.

Examples of the present disclosure are directed to overcoming deficiencies of such systems.

SUMMARY

In an aspect of the present disclosure, a method includes receiving information indicative of a perimeter of a first portion of a work surface, generating, based on the information, a first geofence substantially overlaying the perimeter, the first geofence defining a first internal area, and causing a display to display the first geofence. The method also includes receiving, based on displaying the first geofence, a first input indicating an accuracy of the first geofence. The method further includes determining that at least part of the first geofence is less than a threshold distance from a second geofence associated with the work surface, the second geofence defining a second internal area. The method also includes generating, based on determining that the at least part of the first geofence is less than the threshold distance from the second geofence, a third geofence associated with the work surface, the third geofence including at least part of the first internal area and at least part of the second internal area.

In another aspect of the present disclosure, a system includes a location sensor configured to determine a location of a machine on a work surface, a display, and a controller in communication with the location sensor and the display. In such an example, the controller is configured to receive location information determined by the location sensor, the location information being indicative of a perimeter of a first portion of the work surface, generate, based on the location information, a first geofence substantially overlaying the perimeter, the first geofence defining a first internal area, and cause the display to display the first geofence. In such an example, the controller is also configured to receive, based on displaying the first geofence, a first input indicating an accuracy of the first geofence. In such an example, the controller is further configured to determine that at least part of the first geofence is less than a threshold distance from a second geofence associated with the work surface, the second geofence defining a second internal area. In addition, in such an example the controller is configured to generate, based on determining that the at least part of the first geofence is less than the threshold distance from the second geofence, a third geofence associated with the work surface, the third geofence including at least part of the first internal area and at least part of the second internal area.

In yet another aspect of the present disclosure, a compaction machine includes a substantially cylindrical drum configured to compact a work surface as the compaction machine traverses the work surface, a location sensor configured to determine a location of the compaction machine on the work surface, a display, and a controller in communication with the location sensor and the display. In such an example, the controller is configured to cause the display to display a first geofence associated with the work surface, the first geofence defining a first internal area and being generated based on location information determined by the location sensor. In such an example, the controller is also configured to receive, based on displaying the first geofence, a first input indicating an accuracy of the first geofence. In such an example, the controller is further configured to determine that at least part of the first geofence is less than a threshold distance from a second geofence associated with the work surface, the second geofence defining a second internal area. In such an example, the controller is further configured to generate, based on determining that the at least part of the first geofence is less than the threshold distance from the second geofence, a third geofence associated with the work surface, the third geofence including at least part of the first internal area and at least part of the second internal area. Additionally, in such an example, the controller is configured to cause the compaction machine to perform a task on the work surface, using the drum, and within the third geofence.

DETAILED DESCRIPTION

Figure 1:
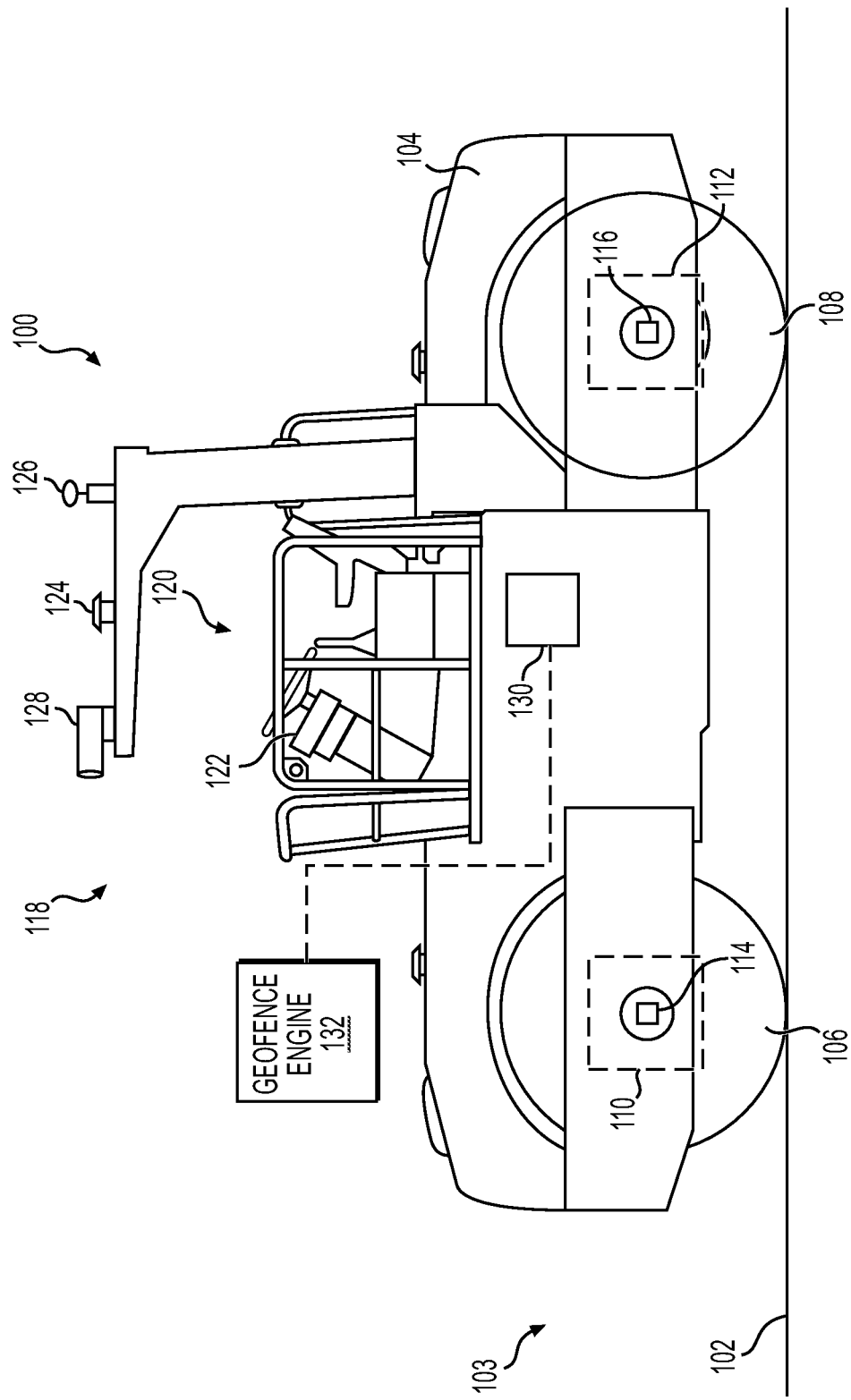
FIG. 1 is a side view of a compaction machine in accordance with an example of the present disclosure.

Wherever possible, the same reference numbers will be used throughout the drawings to refer to same or like parts. FIG. 1 shows an example machine, such as a compaction machine 100. Compaction machine 100 may be configured for use in, for example, road construction, highway construction, parking lot construction, and other such paving and/or construction applications. For example, such a compaction machine 100 may be used in situations where it is necessary to compress loose stone, gravel, soil, sand, concrete, and/or other materials of a work surface 102 to a state of greater compaction and/or density. As compaction machine 100 traverses the work surface 102 of a worksite 103, vibrational forces generated by compaction machine 100 and imparted to the work surface 102, acting in cooperation with the weight of compaction machine 100, compresses the loose materials. Compaction machine 100 typically makes one or more passes over the work surface 102 to provide a desired level of compaction. Although described above as being configured to compact primarily earth-based materials of the work surface 102, in other examples, compaction machine 100 may also be configured to compact freshly deposited asphalt or other materials disposed on and/or associated with the work surface 102. Further, while FIG. 1 illustrates an example compaction machine 100, and while the components of the compaction machine 100 will be described in greater detail below, it is understood that any of the methods described herein may be performed by other heavy duty machines such as cold planers, paving machines, rovers, aerial vehicles (e.g., drones), wheel loaders, dozers, haul trucks, skid steer loaders, graders, or other heavy duty machines configured to perform one or more tasks at the worksite 103. Additionally, any of the components described herein with respect to the compaction machine 100 may be incorporated into one or more such machines to facilitate performing the methods described herein.

As shown in FIG. 1, an example compaction machine 100 includes a frame 104, a first drum 106, and a second drum 108. The first and second drums 106, 108 comprise substantially cylindrical drums and/or other compaction elements of compaction machine 100, and the first and second drums 106, 108 are configured to apply vibration and/or other forces to the work surface 102 in order to assist in compacting the work surface 102. Although illustrated in FIG. 1 as having a substantially smooth circumference or outer surface, in other examples, the first drum 106 and/or the second drum 108 may include one or more teeth, pegs, extensions, bosses, pads, and/or other ground-engaging tools (not shown) extending from the outer surface thereof. Such ground-engaging tools assist in breaking-up at least some of the materials associated with the work surface 102 and/or otherwise assist in compacting the work surface 102. The first drum 106 and the second drum 108 are rotatably coupled to the frame 104 so that the first drum 106 and the second drum 108 roll over the work surface 102 as compaction machine 100 travels.

The first drum 106 may have the same or different construction as the second drum 108. In some examples, the first drum 106 and/or the second drum 108 is an elongated, hollow cylinder with a cylindrical drum shell that encloses an interior volume. The first drum 106 defines a first central axis about which the first drum 106 rotates, and similarly, the second drum 108 defines a second central axis about which the second drum 108 rotates. In order to withstand being in rolling contact with and compacting the loose material of the work surface 102, the respective drum shells of the first drum 106 and the second drum 108 are typically made from a thick, rigid material such as cast iron or steel. Compaction machine 100 is shown as having first and second drums 106, 108. However, other types of compaction machines 100 may be suitable for use in the context of the present disclosure. For example, belted compaction machines or compaction machines having a single rotating drum, or more than two drums, are contemplated herein. Rather than a self-propelled compaction machine 100 as shown, compaction machine 100 might be a tow-behind or pushed unit configured to couple with a tractor (not shown). An autonomous compaction machine 100 is also contemplated herein.

The first drum 106 includes a first vibratory mechanism 110, and the second drum 108 includes a second vibratory mechanism 112. While FIG. 1 shows first drum 106 having a first vibratory mechanism 110 and second drum 108 having a second vibratory mechanism 112, in other examples only one of the first and second drums 106, 108 may include a respective vibratory mechanism 110, 112.

Such vibratory mechanisms 110, 112 may be disposed inside the interior volume of first and second drums 106, 108, respectively.

According to an example, vibratory mechanisms 110, 112 may include one or more weights or masses disposed at a position off-center from the respective central axis around which the first and second drums 106, 108 rotate. As first and second drums 106, 108 rotate, the off-center or eccentric positions of the masses induce oscillatory or vibrational forces to the first and second drums 106, 108, and such forces are imparted to the work surface 102. The weights are eccentrically positioned with respect to the respective central axis around which first and second drums 106, 108 rotate, and such weights are typically movable with respect to each other (e.g., about the respective central axis) to produce varying degrees of imbalance during rotation of first and second drums 106, 108. The amplitude of the vibrations produced by such an arrangement of eccentric rotating weights may be varied by modifying and/or otherwise controlling the position of the eccentric weights with respect to each other, thereby varying the average distribution of mass (i.e., the centroid) with respect to the axis of rotation of the weights. The present disclosure is not limited to these examples described above.

According to an example, a sensor 114 is located on the first drum 106 and/or a sensor 116 is located on the second drum 108. In alternative examples, multiple sensors 114, 116 are located on first drum 106, second drum 108, frame 104, and/or other components of compaction machine 100. In such examples, sensors 114, 116 are compaction sensors configured to measure, sense, and/or otherwise determine the density, stiffness, compaction, compactability, and/or other characteristics of work surface 102. Such characteristics of work surface 102 are based on the composition, dryness, and/or other characteristics of the material being compacted. Such characteristics of the work surface 102 may also be based on the operation and/or characteristics of first drum 106 and/or the second drum 108. For example, sensor 114 coupled to first drum 106 may be configured to sense, measure, and/or otherwise determine the type of material, material density, material stiffness, the moisture level (e.g., water level, saturation level, etc.) of the material, and/or other characteristics of work surface 102 proximate the first drum 106. Additionally, sensor 114 coupled to the first drum 106 may measure, sense, and/or otherwise determine operating characteristics of first drum 106 including a vibration amplitude, a vibration frequency, a speed of the eccentric weights associated with first drum 106, a distance of such eccentric weights from the axis of rotation, a speed of rotation of the first drum 106, etc. It is not necessary to measure all of the operating characteristics of the first drum 106 or second drum 108 listed herein, instead, the above characteristics are listed for exemplary purposes.

With continued reference to FIG. 1, exemplary compaction machine 100 also includes an operator station 118. The operator station 118 includes a steering system 120 including a steering wheel, levers, and/or other controls (not shown) for steering and/or otherwise operating compaction machine 100. In such examples, the various components of the steering system 120 are connected to one or more actuators, a throttle of compaction machine 100, an engine of the compaction machine, a braking assembly, and/or other such compaction machine components, and steering system 120 is used by an operator of compaction machine 100 to adjust a speed, travel direction, and/or other aspects of compaction machine 100 during use. The operator station 118 also includes a control interface 122 for controlling various functions of compaction machine 100. The control interface 122 comprises one or more an analog, digital, and/or touchscreen displays, and control interface 122 is configured to display, for example, at least part of a travel path and/or at least part of a compaction plan of the present disclosure. Control interface 122 may also support other allied functions, including for example, sharing various operating data with one or more other machines (not shown) operating in consonance with compaction machine 100, and/or with a remote server or other electronic device.

Exemplary compaction machine 100 further includes a location sensor 124 connected to a roof of the operator station 118 and/or at one or more other locations on the frame 104. The location sensor 124 can determine a location of compaction machine 100 and may include and/or comprise a component of a global positioning system (GPS). In one example, the location sensor 124 comprises a GPS receiver, transmitter, transceiver or other such device, and the location sensor 124 is in communication with one or more GPS satellites (not shown) to determine a location of compaction machine 100 continuously, substantially continuously, or at various time intervals.

Compaction machine 100 may also include a communication device 126 configured to enable compaction machine 100 to communicate with the one or more other machines, and/or with one or more remote servers, processors, or control systems located remote from the worksite at which compaction machine 100 is being used. Such a communication device 126 may also be configured to enable compaction machine 100 to communicate with one or more electronic devices located at the worksite and/or located remote from the worksite. In some examples, the communication device 126 includes a receiver configured to receive various electronic signals including position data, navigation commands, real-time information, and/or project-specific information. In some examples, the communication device 126 is also configured to receive signals including information indicative of compaction requirements specific to work surface 102. Such compaction requirements may include, for example, a number of passes associated with the work surface 102 and required in order to complete the compaction of work surface 102, a desired stiffness, density, and/or compaction of work surface 102, a desired level of efficiency for a corresponding compaction operation, and/or other requirements. The communication device 126 may further include a transmitter configured to transmit position data indicative of a relative or geographic position of compaction machine 100, as well as electronic data such as data acquired via one or more sensors of compaction machine 100.

Additionally, compaction machine 100 includes a camera 128. The camera 128 may be a state of the art camera capable of providing visual feeds and supporting other functional features of compaction machine 100. In some examples, the camera 128 comprises a digital camera configured to record and/or transmit digital video of the work surface 102 and/or other portions of the worksite in real-time. In still other examples, camera 128 comprises an infrared sensor, a thermal camera, or other like device configured to record and/or transmit thermal images of the work surface 102 in real-time. In some examples as described in more detail below, camera 128 comprises more than one camera. For example, camera 128 may comprise a camera at the front of the machine and a camera at the rear of the machine For capturing digital video or images to cover 360 degrees around compaction machine 100, cameras on the left and right sides as well as the front and rear sides may be employed.

Compaction machine 100 also includes a controller 130 in communication with steering system 120, control interface 122, location sensor 124, communication device 126, camera 128, sensors 114, 116, and/or other components of compaction machine 100. Controller 130 may be a single controller or multiple controllers working together to perform a variety of tasks. Controller 130 may embody a single or multiple microprocessors, field programmable gate arrays (FPGAs), digital signal processors (DSPs), and/or other processors or components configured to generate a compaction plan, one or more travel paths for compaction machine 100 and/or other information useful to an operator of compaction machine 100. Numerous commercially available processors can be configured to perform the functions of controller 130. Various known circuits may be associated with controller 130, including power supply circuitry, signal-conditioning circuitry, actuator driver circuitry (i.e., circuitry powering solenoids, motors, or piezo actuators), and communication circuitry. In some examples, controller 130 may be positioned on compaction machine 100, while in other examples controller 130 may be positioned at an off-board location and/or remote location relative to compaction machine 100.

As illustrated schematically in FIG. 1, the controller 130 may include and/or may otherwise be operably connected to a geofence engine 132. For example, geofence engine 132 may comprise a hardware component (e.g., a processor, a module, etc.) of the controller 130 configured to receive input from one or more of the location sensor, the control interface, the communication device 126, and/or other components of the system 100, and to generate one or more geofences based on such input. Additionally or alternatively, the geofence engine 132 may comprise one or more machine learning models (e.g., a machine learning model trained based on one or more sets of training data including information indicating geographic coordinates associated with the work surface 102, topography information associated with the work surface 102, material characteristics of the work surface 102 and/or other information related to the worksite 103 or other worksites), algorithms, look up tables, executable programs, or other software components of the controller 130 configured to generate one or more geofences based on various input information. Such example software components may be stored, at least in part, in memory operably connected to the controller 130. In any of the examples described herein, the example geofence engine 132 is configured to receive information indicative of a perimeter of a portion of the work surface 102 from, for example, the location sensor 124 and/or from another computing device such as a computing device disposed in a back office at the worksite 103, or a computing device disposed remote from the worksite 103. As will be described below, the geofence engine 132 may also be configured to generate one or more geofences substantially overlaying and/or otherwise defining a perimeter of a portion of the work surface 102 based on the received information. Such an example geofence may define an internal area within which one or more tasks are to be performed on the work surface 102 by the compaction machine 100 and/or by other machines at the worksite 103.

Thus, FIG. 1 illustrates example components of a machine (e.g., the compaction machine 100) that are configured to receive geographic coordinates or other location information indicating a perimeter or other such boundary of a portion of the work surface 102, and to generate one or more corresponding geofences that can be used by the various machines described herein for manual, semi-autonomous, and/or fully-autonomous of tasks within the internal area defined by such geofences. As will be described below, such components are also configured to enable modification of a generated geofence based on an input indicating an accuracy of the geofence. Such components are further configured to generate one or more geofences (e.g., an additional geofence) based on determining that at least part of a first geofence is disposed less than a threshold distance from a second geofence associated with the work surface 103. Any of the methods described herein may be performed, wholly or in part, by the geofence engine 132 and/or the controller 130 described above. Additionally or alternatively, in some examples, the methods described herein may be performed, wholly or in part, by or in conjunction with a control system separate from the controller 130. Such an example control system is illustrated in FIG. 2 and discussed below.

Figure 2:
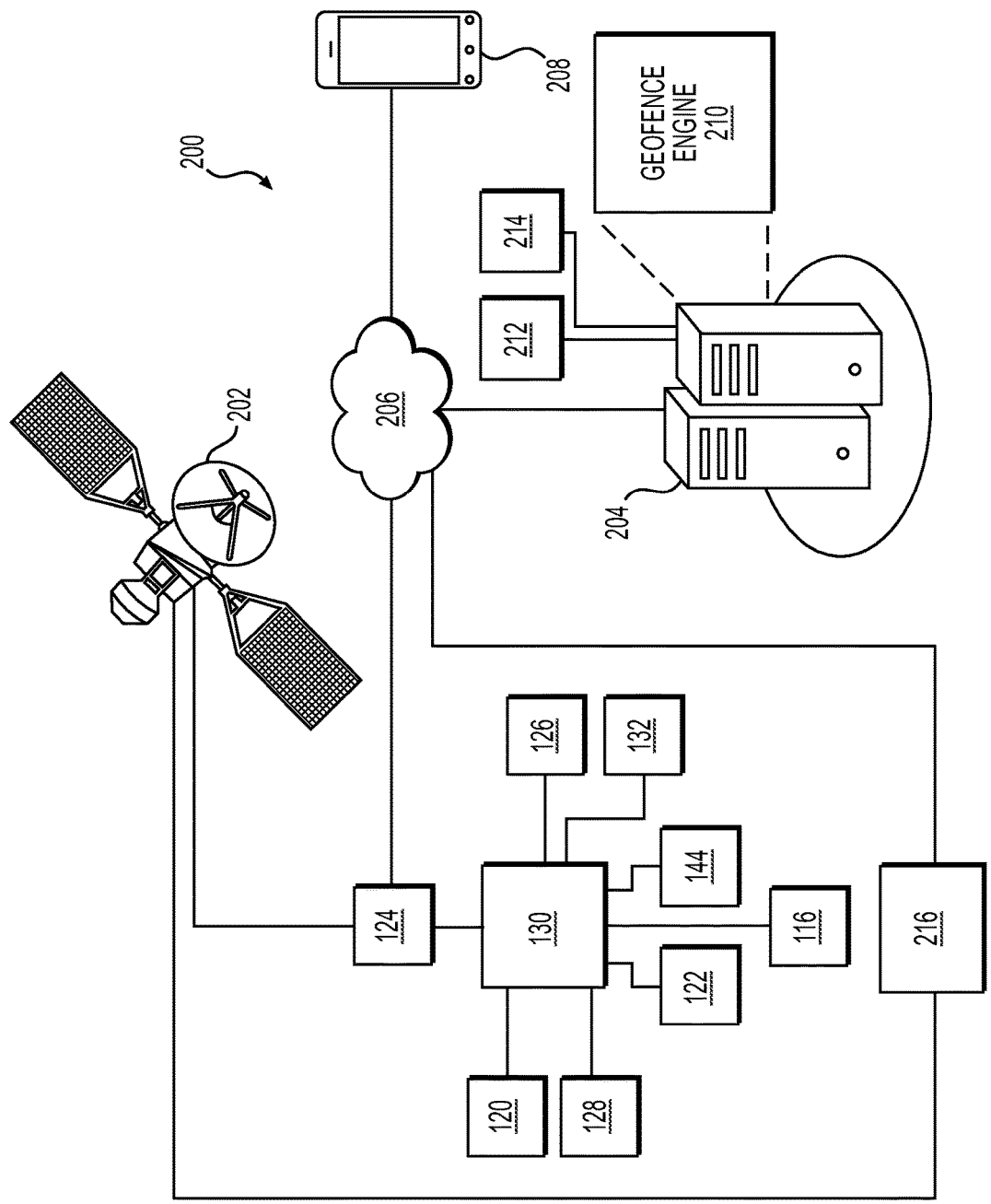
FIG. 2 is a block diagram schematically representing a control system associated with the compaction machine in accordance with an example of the present disclosure.

FIG. 2 is a block diagram schematically illustrating an example control system 200 of the present disclosure. In any of the examples described herein, control system 200 typically includes at least one of controller 130, steering system 120, control interface 122, location sensor 124, communication device 126, camera 128, sensors 114, 116, the geofence engine 132, and/or any other sensors or components of compaction machine 100. In such examples, controller 130 and/or the geofence engine 132 is configured to receive respective signals from the steering system 120, control interface 122, location sensor 124, communication device 126, camera 128, sensors 114, 116, and/or other components noted above. For example, controller 130 receives one or more signals from location sensor 124 including information indicating a location of compaction machine 100. In some examples, location sensor 124 may be configured to determine the location of compaction machine 100 as compaction machine 100 traverses a perimeter of work surface 102 and/or as compaction machine 100 travels to any other worksite location.

As shown in FIG. 2, location sensor 124 is connected to and/or otherwise in communication with one or more satellites 202 or other GPS components configured to assist location sensor 124 in determining the location of compaction machine 100 in any of the example processes described herein. In some examples, such satellites 202 or other GPS components comprise components of control system 200. In any of the examples described herein, location sensor 124 either alone or in combination with satellite 202 are configured to provide the controller with signals including information indicative of a location of the perimeter of work surface 102, the location of compaction machine 100, an elevation of the compaction machine 100, a speed, acceleration, and/or deceleration of the compaction machine 100, and/or other information. Such information includes GPS coordinates of each point along such perimeters and/or of each point along a travel path of the compaction machine. Such information may be determined substantially continuously during movement of compaction machine 100. Alternatively, such information may be determined at regular time intervals (milliseconds, one second, two seconds, five seconds, ten seconds, etc.) as compaction machine 100 travels. Further, any such information is typically stored in a memory associated with controller 130. Such memory may be disposed on compaction machine 100 and/or may be located in the cloud, on a server, and/or on any other electronic device located remote from compaction machine 100.

In certain examples, controller 130 receives respective signals from sensors 114, 116. As noted above, sensors 114, 116 are configured to determine a density, stiffness, compactability, composition, temperature, moisture content, and/or other characteristic of work surface 102. Such sensors 114, 116 may also be configured to determine the vibration frequency, vibration amplitude, and/or other operational characteristics of first drum 106 and second drum 108, respectively. In some examples, sensor 114 determines a density, stiffness, compactability, and/or other characteristic of a portion of the work surface 102 proximate the first drum 106 and/or located along a travel path of compaction machine 100. The sensor 114 typically sends one or more signals to controller 130 including information indicative of such a characteristic, and controller 130 may control vibratory mechanism 110 to modify at least one of a vibration frequency of first drum 106 and a vibration amplitude of first drum 106, as compaction machine 100 traverses the travel path, based at least partly on such information. Similar behavior may be obtained using sensor 116 with respect to second drum 108, if present.

As shown in FIG. 2, control system 200 also includes one or more additional components. For example, control system 200 may include one or more remote servers, processors, or other such computing devices 204. Such computing devices 204 may comprise, for example, one or more servers, laptop computers, or other computers located at a paving material plant remote from the worksite at which compaction machine 100 is being used. In such examples, communication device 126, controller 130, and/or geofence engine 132 are connected to and/or otherwise in communication with such computing devices 204 via a network 206. The network 206 may be a local area network ("LAN"), a larger network such as a wide area network ("WAN"), or a collection of networks, such as the Internet. Protocols for network communication, such as TCP/IP, may be used to implement the network 206. Although examples are described herein as using a network such as the Internet, other distribution techniques may be implemented that transmit information via memory cards, flash memory, or other portable memory devices.

Control system 200 may further include one or more tablets, mobile phones, laptop computers, and/or other mobile devices 208. Such mobile devices 208 may be located at the worksite 103 or, alternatively, one or more such mobile devices 208 may be located at a paving material plant remote from the worksite 103, or at another location remote from the worksite 103. In such examples, communication device 126, controller 130, and/or geofence engine 132 are connected to and/or otherwise in communication with such mobile devices 208 via network 206. In any of the examples described herein, information indicative of the location of the perimeter of the work surface 102, information (e.g., GPS coordinates or other coordinate information determined by the location sensor 124 carried by the compaction machine 100 or another machine disposed on the work surface 102 and/or at the worksite 103) indicative of a perimeter of a portion of the work surface 102, a compaction plan, a travel path of compaction machine 100, vibration amplitudes, vibration frequencies, a density, stiffness, temperature, composition, moisture level, or compactability of the work surface 102, and/or any other information received, processed, or generated by controller 130 may be provided to computing devices 204 and/or mobile devices 208 via network 206.

As shown schematically in FIG. 2, the computing device 204 of the control system 200 may include and/or may otherwise be operably connected to a geofence engine 210. In such examples, the geofence engine 210 illustrated in FIG. 2 may be substantially similar to and/or the same as the geofence engine 132 described above with respect to the compaction machine of FIG. 1. For example, geofence engine 210 may comprise a hardware component (e.g., a processor, a module, etc.) of the computing device 204 configured to receive input from one or more of the location sensor 124 and/or other components of the control system 200, and to generate one or more geofences based on such input. Additionally or alternatively, the geofence engine 210 may comprise one or more machine learning models (e.g., a machine learning model trained based on one or more sets of training data including information indicating geographic coordinates associated with the work surface 102, topography information associated with the work surface 102, material characteristics of the work surface 102 and/or other information related to the worksite 103 or other worksites), algorithms, look up tables, executable programs, or other software components of the computing device 204 configured to generate one or more geofences based on various input information. Such example software components may be stored, at least in part, in memory operably connected to the computing device 204. In any of the examples described herein, the example geofence engine 210 is configured to receive information indicative of a perimeter of a portion of the work surface 102, and to generate one or more geofences substantially overlaying and/or otherwise defining a perimeter of a portion of the work surface 102 based on the received information. Such an example geofence may define an internal area within which one or more tasks are to be performed on the work surface 102 by the compaction machine 100 and/or by other machines at the worksite 103. Additionally, in such examples, the computing device 204 may provide the geofence generated by the geofence engine 210 to the controller 130, via the network 206, and the controller 130 may cause the compaction machine 100 to perform one or more tasks at the worksite 103 based on (e.g., within an internal area defined by) the geofence.

As shown schematically in FIG. 2, the control system 200 may further include one or more user interfaces operably connected to the computing device 210. One or more such user interfaces may be substantially similar to and/or the same as the control interface 122 described above with respect to FIG. 1. For example, such user interfaces may include an input device 212, a display 214, and/or one or more additional devices configured to receive input from an operator and/or other user of the computing device 204. In such examples, the input device 212 may include a keyboard, a mouse, a microphone, and/or any other device configured to receive tactile, voice, and/or other input from the operator. The display 214 may include a monitor, a touchscreen, a CRT display, and LCD display, and/or any other device configured to provide visual output. For example, such a display 214 may be configured to illustrate one or more user interfaces including a visual representation of the various geofences described herein.

In any of the examples described herein, the control system 200 may also include one or more additional machines 216. Such additional machines 216 may include, for example, one or more rovers, drones, unmanned aerial vehicles, and/or any of the other additional heavy-duty machines described above with respect to FIG. 1. Such additional machines 216 may include one or more respective location sensors similar to and/or the same as the location sensor 124 described above with respect to the compaction machine 100. Such additional machines 216 may also include one or more cameras, temperature sensors, material composition sensors, material density sensors, and/or other components described above with respect to the compaction machine 110. Such additional machines 216 may further include one or more respective communication devices similar to and/or the same as the communication device 126 described above with respect to the compaction machine 100. Thus, the one or more additional machines 216 of the control system 200 may be in communication with the compaction machine 100 and/or with the computing device 204 via the network 206. The additional machines 216 may be configured to provide location information (e.g., GPS coordinates) and/or other information indicative of a perimeter of one or more portions of the work surface 102 to the controller 130 and/or to the computing device 204. Any such location information and/or other information determined by the location sensors, cameras, temperature sensors, material composition sensors, material density sensors, and/or other components of the additional machines 216 may be used as inputs by the controller 130 and/or by the computing device 204 (e.g., by the geofence engine 132 and/or by the geofence engine 210) to generate one or more of the geofences described herein.

Figure 3:
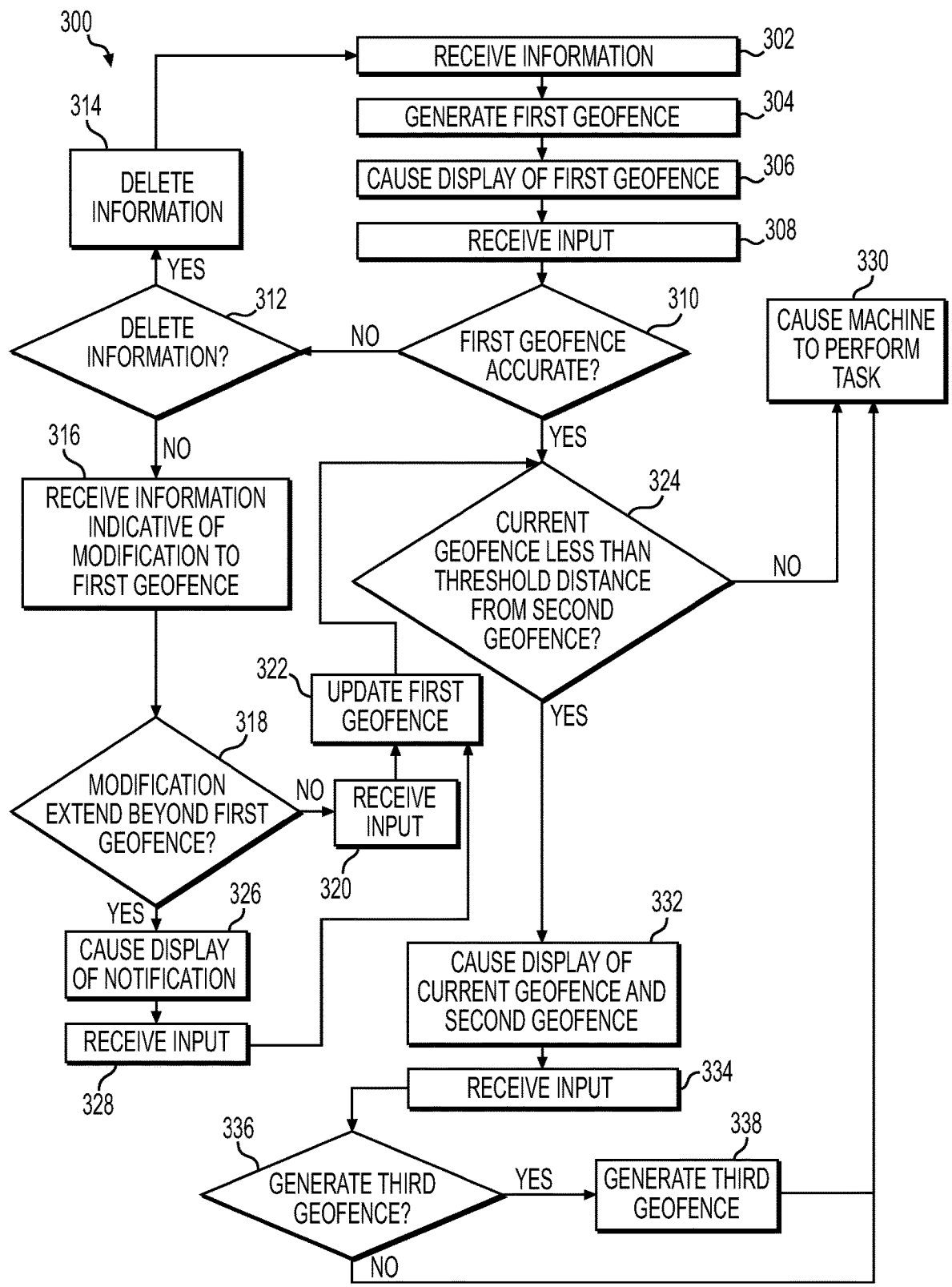
FIG. 3 is a flow chart depicting a method in accordance with an example of the present disclosure.

Through the actions generally of control system 200 as detailed above with respect to FIG. 2, the computing device 204 can receive information indicative of a perimeter of a portion of the work surface 102 (FIG. 1), and can generate one or more geofence is substantially overlaying the perimeter based on such information. As described above, in such examples the computing device 204 may provide information indicative of such a geofence to the controller 130 of the compaction machine 100 via the network 206. In such examples, the controller 130 may cause the compaction machine 100 to perform one or more tasks within an internal area defined by the geofence. Additionally, the size, location, and/or other configurations of at least part of such a geofence may be modified by an operator of the computing device 204 and/or by an operator of the compaction machine 100 for greater accuracy. Additionally, as will be described below, in some examples the computing device 204 and/or the controller 130 may be configured to generate one or more additional geofences associated with the work surface 102 based at least in part on determining that at least part of a first geofence associated with the work surface 102 is less than a threshold distance from a second and/or existing geofence associated with the work surface 102. FIG. 3 indicates representative actions of control system 200 and other components in achieving those results.

FIG. 3 illustrates a flow chart depicting a method 300 of generating one or more geofences in accordance with an example of the present disclosure. The example method 300 is illustrated as a collection of steps in a logical flow diagram, which represents operations that can be implemented in hardware, software, or a combination thereof. In the context of software, the steps represent computer-executable instructions stored in memory. When such instructions are executed by, for example, controller 130, such instructions cause controller 130, computing device 204, various components of control system 200, and/or various components of the compaction machine 100 to perform the recited operations. The computer-executable instructions may include routines, programs, objects, components, data structures, and the like that perform particular functions or implement particular abstract data types. The order in which the operations are described is not intended to be construed as a limitation, and any number of the described steps can be combined in any order and/or in parallel to implement the process. For discussion purposes, and unless otherwise specified, method 300 is described with reference to compaction machine 100 of FIG. 1 and control system 200 of FIG. 2. FIG. 3 serves as an outline of the method performed, and various aspects of method 300 will be described with reference to FIGS. 4-9. Further, in some examples, any of the operations described herein with respect to FIG. 3 may be performed by the controller 130 either alone or in combination with the computing device 204. In other examples, any of the operations described with respect to FIG. 3 may be performed by the computing device 204 alone or in combination with the controller. Nevertheless, for ease of discussion, the method 300 will be described below as being performed by the controller 130 and/or by the geofence 132 unless otherwise noted.

At 302, controller 130 receives information indicative of a perimeter of a first portion of the work surface 102. For example, at 302 the controller 130 receives coordinate information (e.g., GPS coordinates) determined by the location sensor 124 carried by the compaction machine 100 disposed on the work surface 102. Such information may be determined by the location sensor 124 alone or in combination with the satellite 202 and/or other GPS components associated with the control system 200 (FIG. 2). For example, at 302 the compaction machine 100 may be controlled to traverse a portion of the work surface 102 associated with a compaction task and/or other tasks that is to be performed at the worksite 103. In particular, the compaction machine 100 may be controlled to traverse a perimeter of at least a first portion of the work surface 102. As the compaction machine 100 traverses the perimeter of the first portion of the work surface 102, the location sensor 124 may determine GPS coordinates and/or other coordinate or location information indicative of the path traversed by the compaction machine 100 along the work surface 102. At 302, the location sensor 124 may provide such coordinate information to the controller 130 and/or to the computing device 204 (e.g. via the network 206).

Additionally or alternatively, in other examples, information indicative of the perimeter of the portion of the work surface 102 and received at 302 may be determined by location sensors carried by the one or more of the additional machines 216 described above with respect to FIG. 2. In still further examples, information indicative of the perimeter of the portion of the work surface 102 and received at 302 may be determined by one or more manual surveys of the work surface 102 performed by worksite personnel. In additional examples, information indicative of the perimeter of the portion of the work surface 102 and received at 302 may comprise information stored in a memory associated with the computing device 204 and/or associated with the controller 130. In such examples, the information indicative of the perimeter of the portion of the work surface 100 to may comprise information obtained in one or more prior worksite operations or survey exercises. In any of the examples described herein, information received at 302 may comprise accurate coordinates defining one or more sides, circumferences, radii, contours, elevations, and/or other configurations of the perimeter of the portion of the work surface 102.

At 304, the controller 130 generates, based on the information received at 302, a first geofence substantially overlaying the perimeter of the first portion of the work surface 102. As used herein, the term "geofence" refers to a virtual boundary on a geographic area, i.e., a virtual boundary on a subsection of digital map, and may comprise at least two-dimensional coordinates defining the virtual boundary. A geofence may also be called an "electronic fence" or an "e-fence." As in the case of the geofence generated at 304, such a geofence conventionally overlays or corresponds to a perimeter of a portion of a work surface, such as the work surface 102. An example geofence will be described below with respect to at least FIG. 4, and in any of the examples described herein, a geofence may define a virtual boundary on a geographic area within which one or more of the machines described herein are permitted to perform tasks. In some examples, the machines of the present disclosure are prohibited from traveling outside of such a geofence. In establishing a geofence that substantially overlays a perimeter of a first portion of the work surface 102, the controller 130 effectively sets an outer limit to the travel of compaction machine 100. In some examples, the controller 130 has been programmed during a machine learning mode to define the perimeter of various portions of the work surface 102 within which it is expected that the compaction machine 102 will primarily operate. Thus, the first geofence generated at 304 defines a first internal area within which various tasks may be performed by the compaction machine 100 on the work surface 102.

Figure 4:
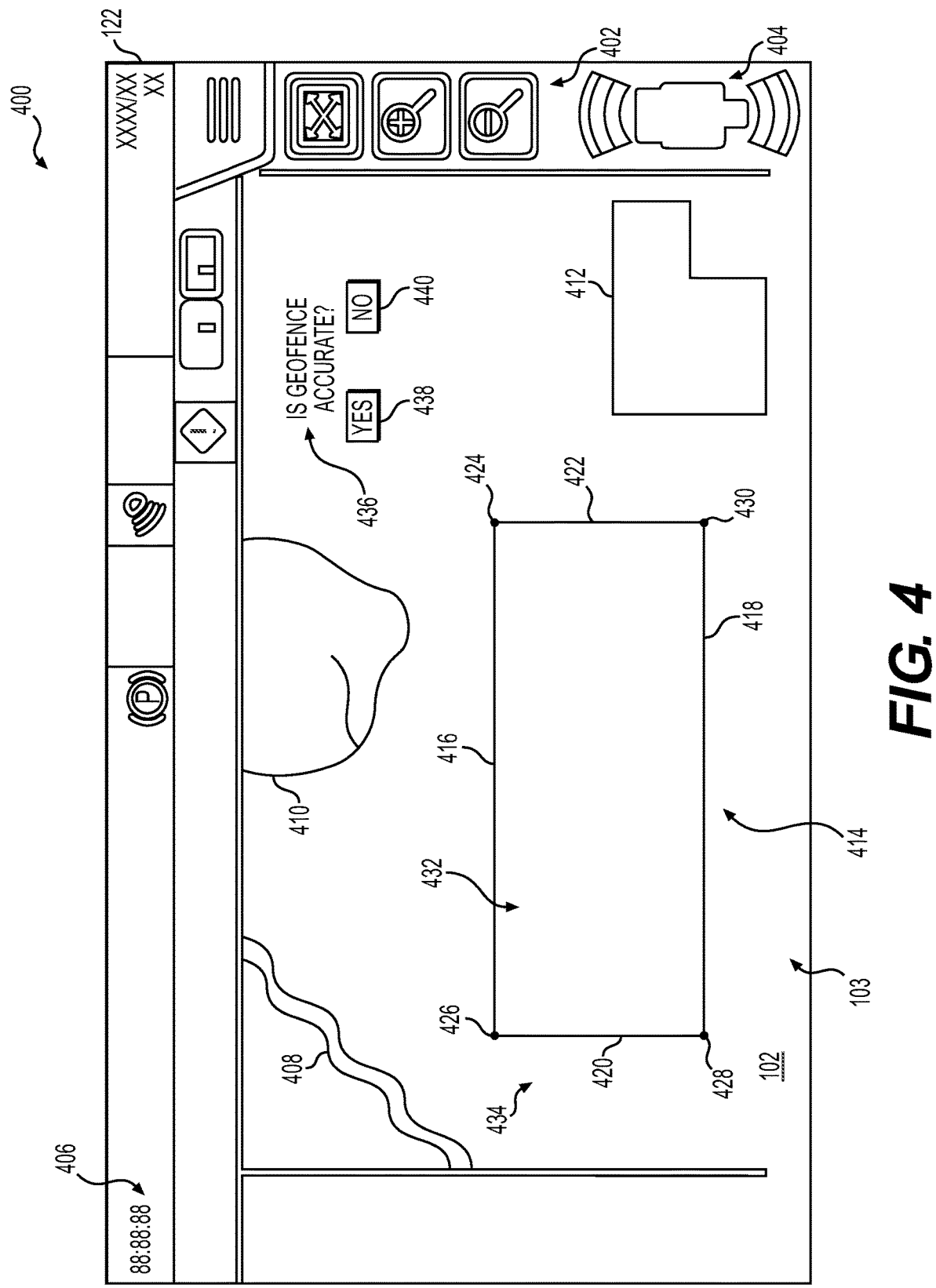
FIG. 4 illustrates an example display providing an example user interface of the present disclosure.

At 306 the controller 130 causes, for example, a display or other component associated with the control interface 122 to display the first geofence generated at 304. For example, as noted above, the control interface 122 may comprise an analog, digital, and/or touchscreen display. In such examples, at 306 the controller 130 may cause a display of the control interface 122 to display a user interface that includes at least part of a travel path, a compaction plan, one or more geofences, and/or other images associated with the work surface 102 and/or associated with the worksite 103, generally. FIG. 4 illustrates an example user interface 400 caused, by the controller 130, to be displayed by the display of the control interface 122 at 306.

As shown in FIG. 4, the example user interface 400 is configured to enable an operator of the compaction machine 100 to interact with the controller 130 and/or with the control system 200. The user interface 400 may include, for example, labels, location names, GPS coordinates of respective locations on the work surface 102, and/or other information associated with the work site 103, and/or with operation of compaction machine 100.

Information provided by user interface 400 is typically displayed and/or updated in real-time to assist the operator in controlling operation of compaction machine 100. As shown in FIG. 4, such example user interfaces 400 may include one or more buttons 402, icons 404, and/or other data fields 406. Such buttons 402, icons 404, and/or data fields 406 may comprise, for example, portions of the touch screen display, and/or other components of the control interface 122 configured to provide information to the operator and/or to receive input (e.g., touch input) from the operator. It is understood that various other controls of compaction machine 100 may also be used to receive such inputs. In still further examples, the control interface and/or other components of compaction machine 100 may be configured to receive such inputs via voice recognition, gesture recognition, and/or other input methodologies. In various examples, controller 130 may also cause the control interface 122 to display one or more additional buttons, icons, and/or other controls operable to control various respective functions of compaction machine 100 and/or of the control interface 122. Other information and controls provided through user interface 400 of control interface 122 will be readily apparent to those of ordinary skill in the art and do not detract from the principles of the present disclosure.

In particular, the example user interface 400 caused to be displayed at 306 provides a visual illustration of at least part of the worksite 103 and, in particular, a visual illustration of various portions of the work surface 102. In some examples, such a visual illustration of the worksite 103 may include illustrations and/or visual indicia of one or more natural structures disposed at the worksite 103 such as, one or more lakes, streams 408, hills 410, trees, and/or other items. Such a visual illustration of the worksite 103 may also include illustrations and/or visual indicia of the work surface 102, as well as one or more man-made structures such as one or more staging areas, parking zones 412, loading zones, unloading zones, roadways, travel paths, charging stations, fueling stations, sewer lines, and/or other items associated with the worksite 103.

As shown in FIG. 4, the example user interface 400 caused to be displayed at 306 also displays and/or otherwise provides a visual illustration of a first geofence 414, such as the first geofence generated at 304. Any of the geofence as described herein may be defined by one or more sides, arcs, curved portions, uneven or jagged segments (e.g., segments with multiple steps or increments), and/or other components so as to define an internal area within which the compaction machine 100 may perform various tasks on the work surface 102. For example, the geofence 414 includes sides 416, 418, 420, 422. Additionally, the geofence 414 includes a plurality of nodes disposed at the intersection of the contiguous sides described above. In particular, the geofence 414 includes a node 424 disposed at the intersection of side 416 and side 422, a node 426 disposed at the intersection of side 416 and side 420, a node 428 disposed at the intersection of side 420 and side 418, and a node 430 disposed at the intersection of side 418 and 422. As described above, the controller 130 and, in particular, the geofence engine 132 generates the sides, nodes, and/or other components of the geofence 414 based on the information received at 302. Thus, the sides, nodes, and/or other components of geofence 414 are located, and are illustrated in the user interface 400 caused to be displayed at 306, at positions substantially overlaying a perimeter of a first portion 434 of the work surface 102 within which various tasks are to be performed on the work surface 102. In this way, the first geofence 414 defines a first internal area 432 that is defined by the perimeter of the first portion 434. In such examples, the first internal area 432 is substantially enclosed by and/or otherwise formed by the sides, nodes, and/or other components of the geofence 414. Further, although the sides 416, 418, 420, 422 of the geofence 414 are illustrated as being substantially linear, flat, or straight, in any of the examples herein, one or more segments, sides, or other components of a geofence may be jagged, uneven, zig-zagged, curved, angled, or have any other irregular or non-linear configuration.

In addition to causing the display of the control interface 122 to display the first geofence 414, at 306 the controller 130 may also cause the display of the control interface 122 to display a request 436 for confirmation as to the accuracy of the geofence 414 generated at 304. Such a request 436 may include, for example, one or more of text, a pop-up window, a request icon, and/or other component of the user interface 400. Such a request 436 may also include one or more additional icons 438, 440 configured to receive an input from the operator in response to consumption of the request 436. For example, request 436 may be accompanied by a first icon 438 comprising a data field configured to receive an input indicating that the geofence 414 generated at 304, and as illustrated in the user interface 400, is accurately positioned, sized, and/or otherwise configured. The request 436 may also be accompanied by a second icon 440 comprising a data field configured to receive an input indicating that the geofence 414 generated at 304, and as illustrated in the user interface 400, is not accurately positioned, sized, and/or otherwise configured.

At 308, the controller 130 receives, based on the geofence 414 being displayed in the user interface 400, a first input indicating the accuracy of the first geofence 414. For example, at 308 controller 130 may receive an input from the user via the first icon 438 confirming that the geofence 414 generated at 304, and illustrated in the user interface 400, is accurately configured. Alternatively, at 308 the controller 130 may receive an input from the user via the second icon 440 confirming that the geofence 414 generated at 304, and illustrated in the user interface 400, is inaccurately configured. In such examples, the input received at 308 may be provided by the operator based on visual inspection of the first geofence 414 illustrated in the user interface 400 and/or based on illustration of the other natural, man-made, and/or other structures located proximate the geofence 414.

At 310, the controller 130 determines whether the first geofence 414 is accurately positioned, sized, and/or otherwise configured based on the input received at 308. For example, if the input received at 308 comprises an input received via the icon 440 and indicating that the first geofence 414 is in some way inaccurate (e.g., inaccurately positioned, sized and/or otherwise configured), the controller 130 may, at 310 make a corresponding determination that the first geofence 414 is currently inaccurate. In such examples, the first geofence 414 may have been inaccurately generated at 304 based on, for example, inaccurate and/or out of date information received at 302. Alternatively, in some situations the first geofence 414 may have been inaccurately generated at 304, however, due to weather conditions (e.g., rain, flooding, etc.), further tasks being performed on the work surface 102 (e.g., a new trench being dug across a portion of the work surface 102), or other developments occurring after generation of the first geofence 414, the first geofence 414 caused to be displayed at 306 may no longer be accurate or current. In any of the examples described above, the controller 130 may determine, at 310 that the first geofence 414 is currently inaccurate (310—No), and may proceed to 312.

Figure 5:
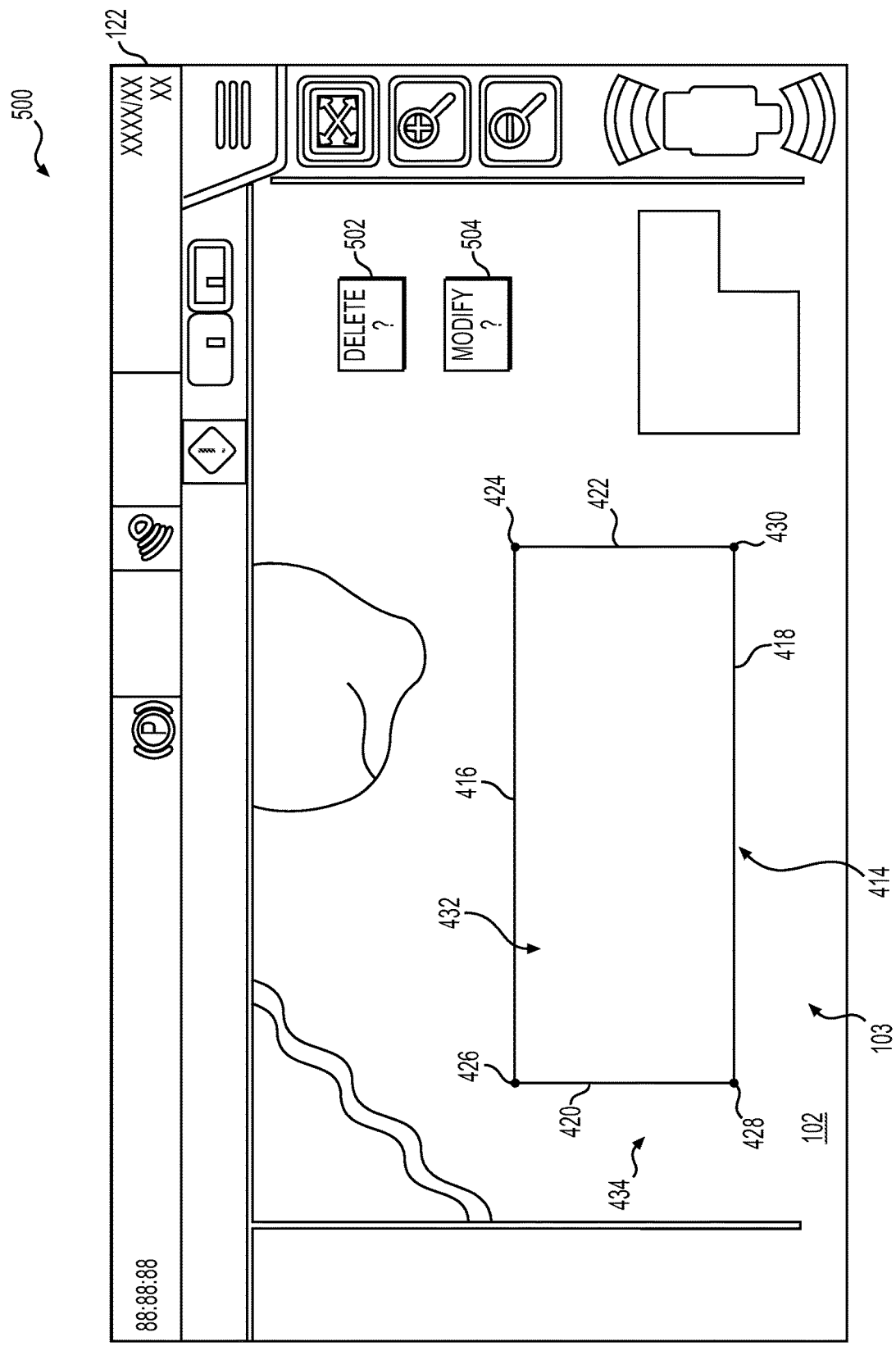
FIG. 5 illustrates an example display providing another example user interface of the present disclosure.

At 312, the controller 130 may cause the display of the control interface 122 to display a request for further information relating to the first geofence 414. Such a request may include, for example, one or more of text, a pop-up window, a request icon, and/or other user interface component inquiring as to whether or not information associated with the first geofence 414 should be deleted or modified. FIG. 5 illustrates an example user interface 500 caused, by the controller 130, to be displayed by the display of the control interface 122 at 312.

For example, FIG. 5 illustrates a user interface 500 that illustrates the first geofence 414 described above, and that includes icons 502, 504 configured to receive an input from the operator indicting whether the illustrated first geofence 414 should be deleted (with respect to icon 502) or modified (with respect to icon 504). For example, the icon 502 may comprise a data field configured to receive an input indicating that the geofence 414 generated at 304, and as illustrated in the user interface 500, should be deleted. An input received via the icon 502 may, in some examples, cause the controller 130 to delete the first geofence 414 from memory. In some examples, and input received via the icon 502 may also cause the controller 130 to delete information received at 302 and utilized to generate the first geofence 414 at 304. In other examples, it is understood that an input received via the icon 502 may cause the controller 130 to delete the first geofence 414 from memory, but may cause the controller 130 to save and/or otherwise retain the information received at 302 for future use. On the other hand, and input received via the icon 504 may cause the controller 132 provide one or more additional user interfaces configured to enable the operator to provide manual modifications and/or other input indicative of a desired modification to the first geofence 414.

With continued reference to FIG. 3 and the user interface 500 of FIG. 5, at 312 the controller 130 may receive an input, via the icon 502, indicating the first geofence 414 generated at 304, and as illustrated in the user interface 500, should be deleted. In such examples, the controller 130 may, at 312, make a corresponding determination that the first geofence 414 is to be deleted from memory (312—Yes), and may proceed to 314. At 314, the controller 130 causes the first geofence 414 to be deleted from memory. Additionally, in some examples, at 314 the controller 130 causes the information received at 302 and used to generate the first geofence 414 at 304 to be deleted from the memory as well. From 314, the controller 130 may proceed to 302, and additional location information and/or other information may be received.

Alternatively, at 312 the controller 130 may receive an input, via the icon 504, indicating the first geofence 414 generated at 304, and as illustrated in the user interface 500, should be modified. In such examples, the controller 130 may, at 312, make a corresponding determination that the first geofence 414 is to be modified rather than deleted (312—No), and may proceed to 316.

Figure 6:
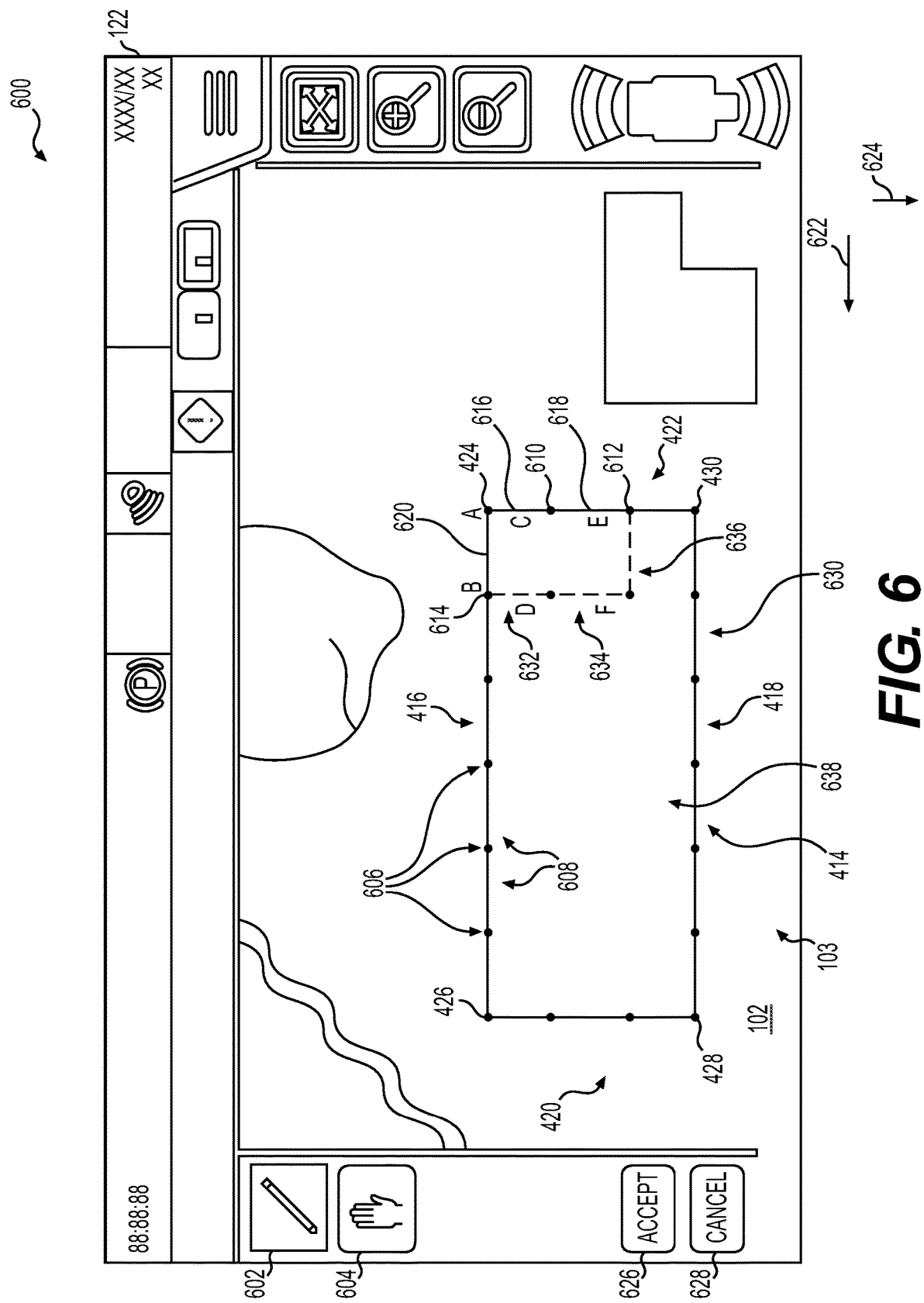
FIG. 6 illustrates an example display providing still another example user interface of the present disclosure.

At 316, the controller 130 receives additional information (e.g., second information) indicative of a modification to the first geofence 414. For example, at 316 the controller 130 may cause the display of the control interface 122 to display a user interface configured to receive input from the operator, thereby enabling the operator to manually modify the first geofence 414. FIG. 6 illustrates an example user interface 600 caused, by the controller 130, to be displayed by the display of the control interface 122 at 316.

As shown in FIG. 6, in addition to illustrating the first geofence 414, the example user interface 600 may include, for example, one or more tools 602 enabling the operator to draw modifications to the first geofence 414, one or more tools 604 enabling the operator to grab, drag, move, and/or otherwise manipulate the first geofence 414 manually (e.g., via touch inputs entered using the touchscreen), and/or other tools, data entry fields, icons or user interface components. Such tools 602, 604 may be similar to the one or more buttons 402, icons 404, data fields 406, and/or other icons described above with respect to FIG. 4. In still further examples, the control interface and/or other components of compaction machine 100 may be configured to receive inputs and/or other information at 316 via voice recognition, gesture recognition, and/or other input methodologies.

As shown in FIG. 6, the example user interface 600 displayed at 316 displays and/or otherwise provides a visual illustration of the various sides 416, 418, 420, 422 and nodes 424, 426, 428, 430 of the first geofence 414. Additionally, and based on determining that the first geofence 414 is to be modified rather than deleted, the first geofence 414 displayed in the user interface 600 may include one or more additional nodes along one or more of the sides 416, 418, 420, 422. Such additional nodes (e.g., nodes 606, 610, 612, 614, etc.) of the first geofence 414, may enable the operator to manually increase the size of the first geofence 414, manually decrease the size of the first geofence 414, and/or otherwise manipulate the configuration of the first geofence 414. For example, upon selecting the tool 604, the user interface 600 may enable the operator to drag one or more of the nodes described above to a different location on the user interface 600, and such an input and/or other information received by the controller 130 at 316, via the user interface 600, may cause the controller 132 make a corresponding modification to the coordinates and/or other configurations of the first geofence 414. Similarly, the first geofence 414 displayed in the user interface 600 may include one or more segments (e.g., segments 608, 616, 618, 620, etc.). As shown in, FIG. 6, such segments may comprise individual portions of the various sides 416, 418, 420, 422, and each respective segment may be defined by a pair of adjacent nodes. In such examples, and similar to the process described above with respect to the nodes shown in the user interface 600, upon selecting the tool 604, the user interface 600 may enable the operator to drag one or more of the individual segments to a different location on the user interface 600. In such examples, such an input and/or other information received by the controller 130 at 316, via the user interface 600, may cause the controller 132 to make a corresponding modification to the first geofence 414.

For instance, with reference to FIG. 6, upon selecting the tool 604, the operator may drag the node 424, via a touch input and in the direction of a row 622, from location A to a new location B. Similarly, the operator may drag the node 610, via a touch input and in the direction of arrow 622, from location C to a new location D. The operator may also drag the node 612, via a touch input and in the direction of arrow 622, from the location E to a new location F. Additionally or alternatively, upon selecting the tool 604, the operator may drag the segment 620 in the direction of arrow 624, and my drag one or both of the segments 616 and 618 in the direction of a row 624. One or more such inputs received, via the user interface 600, at 316 may be indicative of a request to modify the configuration of the first geofence 414 and, in particular, to reduce the size of the first geofence 414.

At 318, the controller 130 determines whether the one or more inputs and/or other information received at 316 is indicative of a modification to the first geofence 414 that extends beyond the current perimeter of the first geofence 414, or that otherwise increases the internal area 432 of the first geofence 414. If, at 318, the controller 130 determines that the indicated modification to the first geofence 414 does not extend beyond the current perimeter of the first geofence 414 and does not otherwise increase the internal area 432 of the first geofence 414 (318—No), the controller 130 may cause the display of the control interface 122 to display one or more additional controls or other components configured to receive additional input from the operator. For instance, as shown in FIG. 6, based on determining that the indicated modification to the first geofence 414 does not extend beyond the current perimeter of the first geofence 414 and does not otherwise increase the internal area 432 of the first geofence 414, the controller 130 may cause the display of the control interface 122 to display a control 626 configured to receive an input indicating that the operator accepts a proposed change to the first geofence 414, and a control 628 configured to receive an input indicating that the operator rejects or cancels a proposed change to the first geofence 414.

In some examples, at 318 the controller 130 causes the display of the control interface 122 to display an updated geofence 630 based on and/or otherwise in accordance with the one or more inputs and/or other information received at 316. As shown in FIG. 6, such an example update geofence 630 may include one or more sides of the first geofence 414 (e.g., the sides 418 and 420) substantially unchanged. The example updated geofence 630 may also include one or more sides of the first geofence 414 that have been relocated either in whole or in part. For example, the updated geofence 630 shown in FIG. 6 includes the side 422 with the segment 616 relocated to the position 632 and the side 618 relocated to the position 634. The example updated geofence 630 also includes the side 416 with the segment 620 relocated to the position 636. Accordingly, the updated geofence 630 of FIG. 6 includes an internal area 638 that is defined, in part, by these relocated sides and/or segments, and that is less than the internal area 432 of the first geofence 414. For example, any of the internal areas described herein (e.g., internal area 638) may have or may otherwise be characterized by a value (e.g., square feet, square miles, etc.). In the example noted above, the internal area 638 may have a value (in square feet) that is less than a corresponding value (in square feet) of the internal area 432.

At 320, the controller 130 receives an input via one of the controls 626, 628. In examples in which the operator provides an input, at 320 and via control 628, indicative of a request to cancel the updates made to the first geofence 414 (e.g., a request to cancel or reject the updated geofence 630), the controller 130 may continue to receive further inputs and/or modifications to the first geofence 414 at 320, via the user interface 600, until such updates are accepted. Alternatively, the controller 130 may proceed from 320 to one of operations 310, 312, or 316. On the other hand, in examples in which the operator provides an input, at 320 and via control 626, indicative of a request to accept the updates made to the first geofence 414 (e.g., a request to accept or approve the updated geofence 630), the controller 130 may, at 322, update the first geofence 414 to include the configurations indicated by the information received at 316. In some examples, at 322 the controller 130 may update the first geofence 414 to have the configuration of the updated geofence 630 described above. In any of the examples described herein, at 322 and based on receiving an input via the control 626 at 320, the controller 130 may replace the first geofence 414 with the updated geofence 630 in a memory associated with the controller 130.

On the other hand if, at 318 the controller 130 determines that the indicated modification to the first geofence 414 does extend beyond the current perimeter of the first geofence 414 or that the indicated modification would otherwise increase the internal area 432 of the first geofence 414 (318—Yes), the controller 130 may cause the display of the control interface 122 to display an updated geofence based on the information received at 316, together with one or more notifications, alerts, or other information indicative of the requested increase in geofence size. The controller 130 may also cause the display of the control interface 122 to display one or more additional controls or other components configured to receive additional input from the operator, as described above with reference to the controls 626, 628 of FIG. 6. For instance, as shown by the example user interface 700 illustrated in FIG. 7, based on determining that the indicated modification to the first geofence 414 does extend beyond the perimeter of the first geofence 414 or that the indicated modification would otherwise increase the internal area 432 of the first geofence 414, the controller 130 may cause the display of the control interface 122 to display the control 626 configured to receive an input indicating that the operator accepts a proposed change to the first geofence 414, and the control 628 configured to receive an input indicating that the operator rejects or cancels a proposed change to the first geofence 414.

Figure 7:
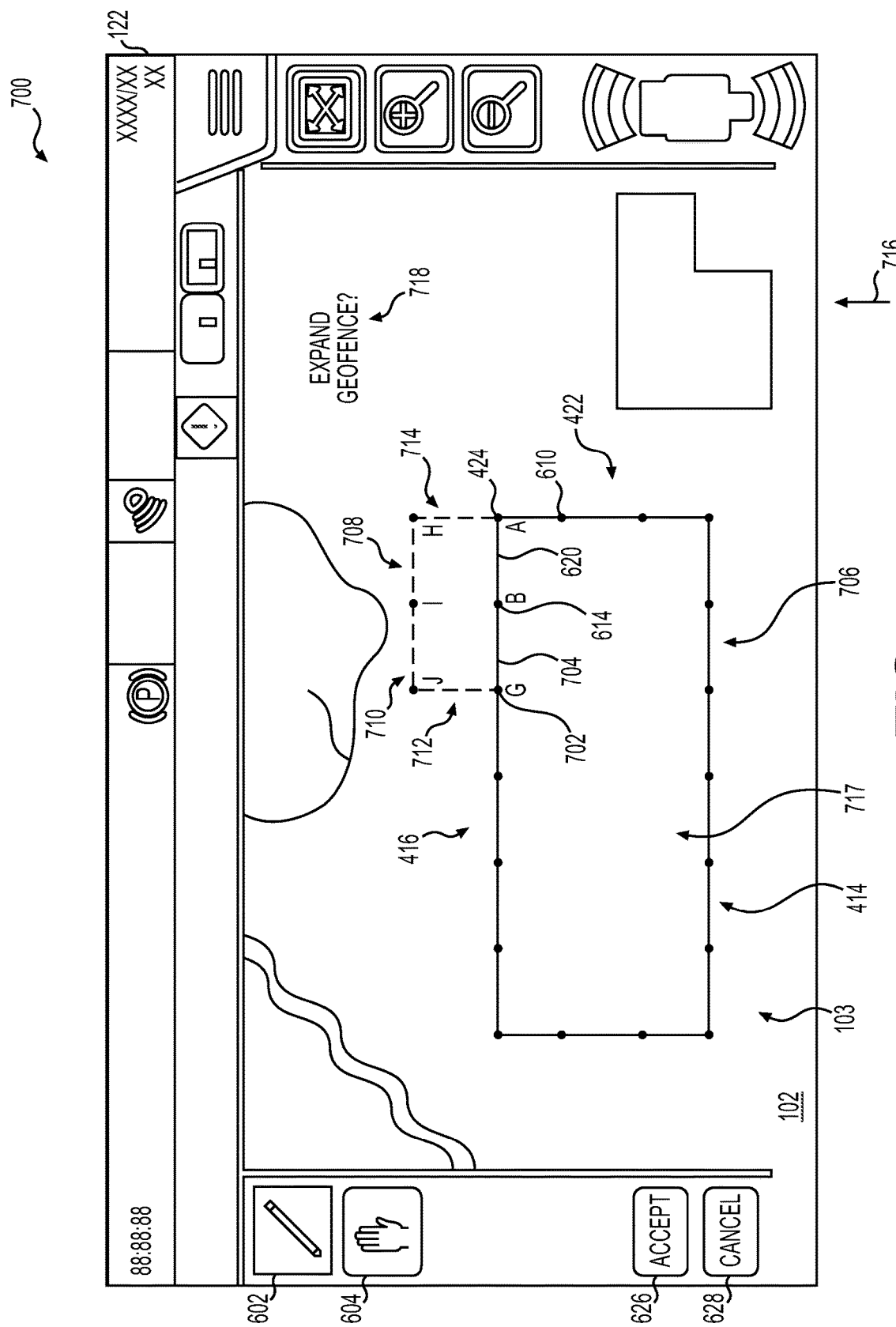
FIG. 7 illustrates an example display providing yet another example user interface of the present disclosure.

With continued reference to FIG. 7, in some examples, at 318 the controller 130 causes the display of the control interface 122 to display an updated geofence 706 based on and/or otherwise in accordance with the one or more inputs and/or other information received at 316. As shown in FIG. 7, such an example updated geofence 706 may include one or more sides, segments, and/or nodes that are substantially unchanged relative to the first geofence 414. The example updated geofence 706 may also include one or more sides, segments, nodes, or other configurations that have been moved and/or otherwise modified based on the information received at 316. For instance, in an example in which, at 316 and upon selecting the tool 604, the operator drags a node 702, via a touch input and in the direction of a row 716, from a location G to a new location J, drags the node 614 in the direction of arrow 716 from the location B to a new location I, and/or drags the node 422 in the direction of arrow 716 from the location A to a new location H, such inputs may be indicative of a request to modify the configuration of the first geofence 414 and, in particular, to increase the size and/or internal area 432 of the first geofence 414. Additionally or alternatively, in such an example, upon selecting the tool 604, the operator may drag a segment 704 and/or the segment 620 in the direction of arrow 716. Such inputs may also be indicative of a request to increase the size and/or internal area 432 of the first geofence 414. One or more such inputs received via the user interface 700, at 316, may cause the controller 130 to, for example, relocate the segment 620 to the location 708, and to relocate the segment 704 to the position 710. As a result, the updated geofence 706 may include, for example, the side 416 with the segments 620 and 704 relocated to such new positions. As illustrated in FIG. 7, the example updated geofence 706 may further include a new segment 712 extending from location G to location J, a new segment 714 extending from location A to location H, and/or one or more additional new nodes, segments, or other components based on the information received at 316. As shown in FIG. 7, the resulting updated geofence 706 may have an internal area 717 that is defined, at least in part, by these relocated and/or new sides or segments, and that is greater than the internal area 432 of the first geofence 414. For example, the internal area 717 may have a value (in square feet) that is greater than a corresponding value (in square feet) of the internal area 432.

At 326, the controller 130 causes the display of the control interface 122 to display a notification corresponding to the modification requested at 316 and/or other information received at 316. For example, as shown in FIG. 7, at 326 controller 130 may cause the display of the control interface 122 to display one or more of text, a pop-up window, a request icon, an alert, a notification 718, and/or other user interface component indicating that the requested modifications would extend beyond the perimeter and/or other configurations of the first geofence 414, and/or inquiring as to whether or not the first geofence 414 should be expanded in accordance with the information received at 316.

At 328, the controller 130 receives an input via one of the controls 626, 628. In any of the examples described herein, the controller 130 may receive an input at 328, and via one of the controls 626, 628 based on display of the notification 718 at 326. In examples in which the operator provides an input, at 328 and via control 628, indicative of a request to cancel the updates made to the first geofence 414 (e.g., a request to cancel or reject the updated geofence 706), the controller 130 may continue to receive further inputs and/or modifications to the first geofence 414 at 328, via the user interface 600, until such updates are accepted. Alternatively, the controller 130 may proceed from 328 to one of operations 310, 312, or 316. On the other hand, in examples in which the operator provides an input, at 328 and via control 626, indicative of a request to accept the updates made to the first geofence 414 (e.g., a request to accept or approve the updated geofence 706), the controller 130 may, at 322, update the first geofence 414 based on the input received 328 and in accordance with the information received at 316. For example, at 322 the controller 130 may update the first geofence 414 to include the configurations indicated by the information received at 316. In some examples, at 322 the controller 130 may update the first geofence 414 to have the configuration of the updated geofence 706 described above. In any of the examples described herein, at 322 and based on receiving an input via the control 626 at 328, the controller 130 may replace the first geofence 414 with the updated geofence 706 in a memory associated with the controller 130.

It is understood that, in any of the examples described herein, the controller 130 may require one or more additional confirmation inputs before enlarging the first geofence 414, and/or before otherwise moving a node, segment, side, or other component of the first geofence 414 to a location outside of the perimeter of the first geofence 414. For example, in addition to receiving the input at 328, via the control 626, the controller 130 may further require the operator to traverse at least the expanded portion of the updated geofence 706 with the machine 100, and to provide further confirmation once this additional step is complete, before updating the first geofence 414 at 322. Additionally or alternatively, the controller 130 may further require a separate approval from a foreman or other worksite employee before updating the first geofence 414 at 322. Additionally or alternatively, the controller 130 may further require confirmation, from the camera 128 and/or other sensors of the machine 100, from a sensor or perception system of one or more of the additional machines 216, and/or from any other sensor or component of the control system 200, before updating the first geofence 414 at 322. In such examples, such a confirmation may indicate that no humans, machines, man-made structures or other objects are disposed within the proposed internal area 717 of the updated geofence 706. In such examples, such a confirmation may also indicate that no such objects are disposed within a minimum threshold distance (e.g., 10 feet, 50 feet, 100 feet, etc.) of the updated geofence 706.

With continued reference to FIG. 3, upon updating the first geofence 414 at 322, the controller 130 proceeds to 324. Additionally or alternatively, if the input received at 308 comprises an input received via the icon 438 and indicating that the first geofence 414 is accurately positioned, sized and/or otherwise configured, the controller 130, at 310 makes a corresponding determination that the first geofence 414 (e.g., the current geofence) is currently accurately configured. In such examples, the controller 130 determines, at 310, that the first geofence 414 is currently inaccurate (310—Yes), and proceeds to 324.

Figure 8:
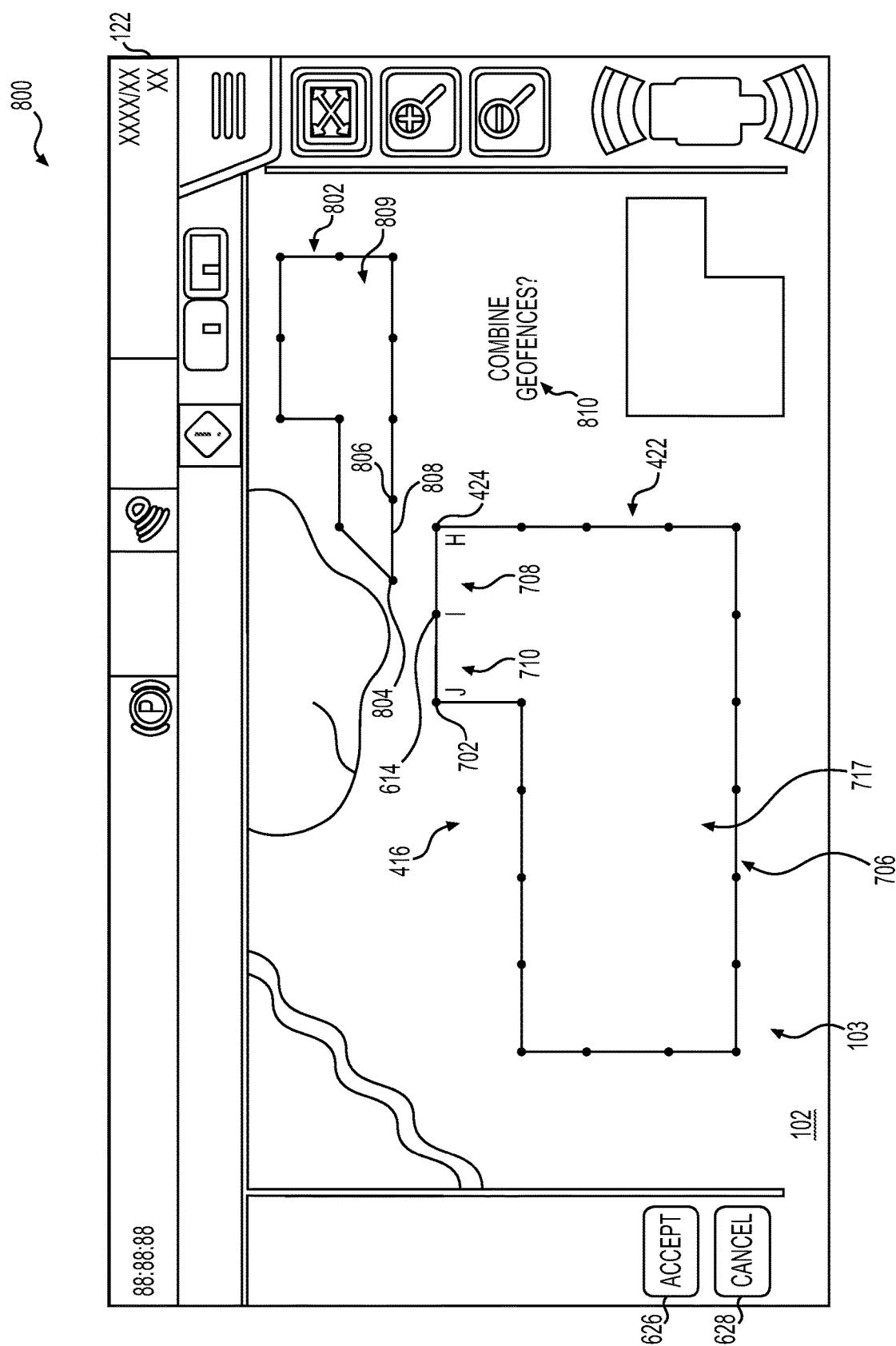
FIG. 8 illustrates an example display providing a further example user interface of the present disclosure.

At 324, the controller 130 determines whether at least part of the current geofence (e.g., the first geofence 414 or the updated geofence 706 described above) is less than a threshold distance from one or more additional geofences (e.g., a second geofence) associated with the work surface 102. For example, at 324 and as illustrated by the example user interface 800 shown in FIG. 8, the controller 130 determines whether a node, side, segment, and/or any other component of the updated geofence 706 is less than a threshold distance from a second geofence 802 associated with the work surface 102. While the example user interface 800 shown in FIG. 8 includes the updated geofence 706 described above, it is understood that in further examples the controller 130 may make such a determination at 324 based on the location and/or configuration of the first geofence 414, and/or based on the location/configuration of any of the other geofences described above. As shown in FIG. 8, the example second geofence 802 may include components and/or configurations that are similar to the first geofence 414, the updated geofence 706, and/or other geofence as described herein. For example, the second geofence 802 shown in the example user interface 800 includes one or more nodes 804, 806, one or more segments 808, one or more sides, and/or any of the other geofence features or components noted herein. The one or more nodes 804, 806, one or more segments 808, one or more sides, and/or other components of the second geofence 802 may, together, substantially enclose and/or otherwise define an internal area 809 of the second geofence 802, similar to the internal area 432 described above with respect to at least FIG. 4. In such examples, the second geofence 802 may comprise an existing geofence stored in a memory associated with the controller 130. For instance, the second geofence 802 may comprise a geofence that was generated and/or that was in existence prior to generation of the first geofence 414 at 304, and/or prior to generation of the updated geofence 706. Such an example second geofence 802 may be associated with, for example, one or more additional projects or tasks to be performed on the work surface 102.

In any of the examples described herein, at 324 the controller 130 determines whether, for example, one or more of the nodes 424, 614, 702, and/or other nodes of the updated geofence 706 is less than a threshold distance from one or more of the nodes 804, 806, one or more of the segments 806, and/or one or more of the sides of the second geofence 802. Additionally or alternatively, at 324 the controller 130 determines whether, for example, one or more of the segments 708, 710, and/or other segments of the updated geofence 706 is less than the threshold distance from one or more of the nodes 804, 806, one or more of the segments 806, and/or one or more of the sides of the second geofence 802. Additionally or alternatively, at 324 the controller 130 determines whether, for example one or more of the sides 416, 422 of the updated geofence 706 is less than the threshold distance from one or more of the nodes 804, 806, one or more of the segments 806, and/or one or more of the sides of the second geofence 802. In some examples, such a threshold distance may be less than or equal to approximately 10 feet, less than or equal to approximately 50 feet, less than or equal to approximately 100 feet, and/or any other desired distance. In still further examples, at 324 the controller 130 may determine whether at least part of the updated geofence 706 overlays the second geofence 802. In such examples, at least part of one or more of the nodes, segments, sides, and/or other components of the updated geofence 706 may be disposed within the internal area 809 of the second geofence 802. Additionally or alternatively, in such examples at least part of the one or more nodes, segments, sides, and/or other components of the updated geofence 706 may be the co-located with and/or may otherwise overlay one of the nodes, segments, sides, and/or other components of the second geofence 802. In any such examples, it may be desirable for the controller 130 to combine the updated geofence 706 with the second geofence 802 such that machines performing tasks on the work surface 102 may be configured and/or otherwise permitted to traverse portions of the work surface 102 located or otherwise disposed within either the internal area of the updated geofence 706 or the internal area 809 of the second geofence 802. In such examples, combining the updated geofence 706 with the second geofence 802 may comprise generating an additional geofence (e.g., generating a third geofence) as will be described below.

If, at 324, the controller 130 determines that at least part of the current geofence (e.g., the first geofence 414, the updated geofence 706, etc.) is less than the threshold distance from the second geofence 802 (324—Yes), the controller 130 causes, at 332 and as illustrated in FIG. 8, the display of the control interface 122 to display the current geofence (e.g., the updated geofence 706) together with the second geofence 802. Additionally, at 332 the controller 130 causes the display of the control interface 122 to display a notification 810 corresponding to the determination made at 324. For example, as shown in FIG. 8, at 332 the controller 130 causes the display of the control interface 122 to display one or more of text, a pop-up window, a request icon, an alert, a notification 810, and/or other user interface component inquiring as to whether or not the current geofence (e.g., the updated geofence 706) should be combined with the second geofence 802. It is understood that in some examples two or more additional geofences may be disposed proximate the updated geofence 706. In such examples, at 332 the controller 130 may cause the display of the control interface 122 to display each of the additional geofences for which the threshold distance criteria described above with respect to 324 have been satisfied. Additionally, in such examples, at 332 the controller 130 may cause the display of the control interface 122 to display respective notifications 810 corresponding to each of the additional geofences. In any of the examples described herein, the notification 810 may comprise a request for a confirmation associated with combining the two or more geofences and/or associated with generating an additional geofence (e.g., a third geofence).

At 334, the controller 130 receives an input via one of the controls 626, 628 included in the user interface 800. In any of the examples described herein, the controller 130 may receive an input at 334, and via one of the controls 626, 628, based on display of the notification 810 and/or based on the display of the geofences 706, 802 at 332. In examples in which the operator provides an input, at 334 and via control 628, indicative of a request to cancel the suggested combination of the updated geofence 706 with the second geofence 802 (e.g., a request to reject the combination of geofences), at 336 the controller 130 may make a corresponding determination that a third geofence is not to be generated (336—No), and may proceed to 330. At 330, and based on the determination made at 336 (e.g., based on receiving the input via control 628 at 334), the controller 130 may cause, for example, the compaction machine 100 to perform one or more tasks on the work surface 102 within the internal area defined by the current geofence (e.g., within the internal area defined by the updated geofence 706). In such examples, at 330, the controller 130 may cause the compaction machine 100 to, for example, perform a task on the work surface 102 (e.g., a compaction task) using the drum 106, and within the internal area 717 of the updated geofence 706.

On the other hand, in examples in which the operator provides an input, at 334 and via control 626, indicative of a request to accept the suggested combination of the updated geofence 706 with the second geofence 802 (e.g., a request to accept or otherwise confirm the suggested combination of geofences), the controller 130 may, at 336, may make a corresponding determination that a third geofence is to be generated (336—Yes), and may proceed to 338.

It is understood that, in any of the examples described herein, at 336, the controller 130 may require one or more additional confirmation inputs before determining that such a third geofence is to be generated. For example, in addition to receiving the input at 334, via the control 626, the controller 130 may further require the operator to traverse at least part of the work surface 102 disposed at an area on the work surface 102 between the two existing geofences (and to be incorporated within the new geofence) with the machine 100, and to provide further confirmation once this additional step is complete, before generating an additional geofence. Additionally or alternatively, the controller 130 may further require a separate approval from a foreman or other worksite employee before generating such an additional geofence. Additionally or alternatively, the controller 130 may further require a confirmation, from the camera 128 and/or other sensors of the machine 100, from a sensor or perception system of one or more of the additional machines 216, and/or from any other sensor or component of the control system 200, before generating an additional geofence. In such examples, such a confirmation may indicate that no humans, machines, man-made structures or other objects are at an area on the work surface 102 between the two existing geofences (and to be incorporated within the new geofence). In such examples, such a confirmation may also indicate that no such objects are disposed within a minimum threshold distance (e.g., 10 feet, 50 feet, 100 feet, etc.) of such an area.

Figure 9:
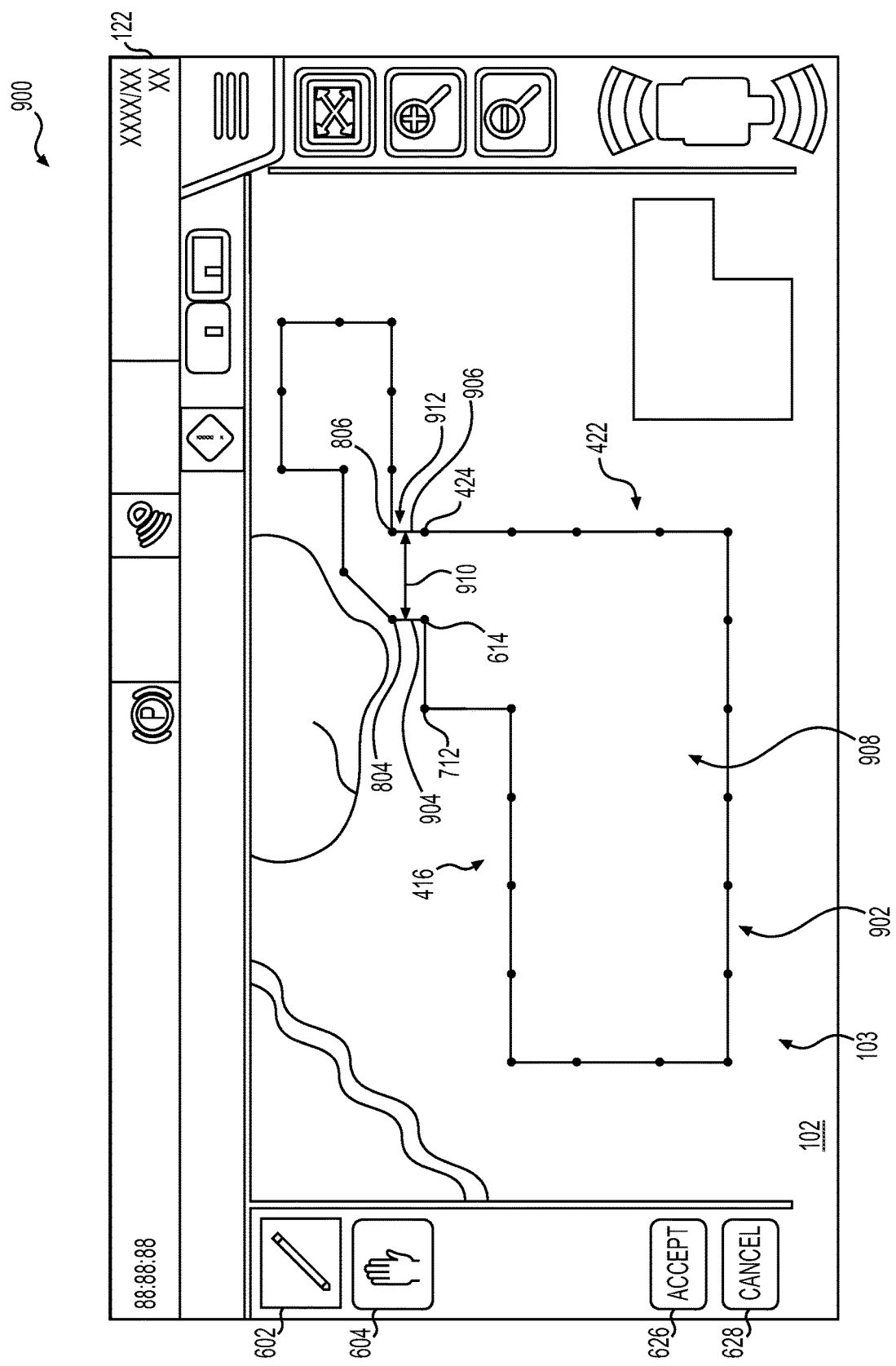
FIG. 9 illustrates an example display providing another example user interface of the present disclosure.

At 338, and based on the determination made at 336 (e.g., based on receiving the input via control 626 at 334, and/or based on receiving one or more of the confirmations noted above), the controller 130 may generate an additional geofence (e.g., a third geofence) associated with the work surface 102. In such examples, at 338, the controller 130 may generate such an additional geofence based at least in part on determining that at least part of the updated geofence 706 or the first geofence 414 is less than the threshold distance from the second geofence 802 described above. In any of the examples described herein, the additional geofence generated at 338 may comprise a merged or "combined" geofence, and the additional geofence may include at least part of the internal areas of the geofences being combined. For example, the additional geofence generated at 338 may include and/or may be formed based on at least part of the internal area 717 of the updated geofence 706 and at least part of the internal area 809 of the second geofence 802. Alternatively, the additional geofence generated at 338 may include and/or may be formed based on at least part of the internal area 432 of the first geofence 414 and at least part of the internal area 809 of the second geofence 802. FIG. 9 provides an example user interface 900 illustrating such an example third geofence 902 generated at 338.

As shown in FIG. 9, the example third geofence 902 may include components and/or configurations that are similar to the first geofence 414, the updated geofence 706, the second geofence 802, and/or other geofences described herein. For example, the third geofence 902 shown in the example user interface 900 includes one or more nodes 424, 702, 804, 806, one or more segments 904, 906, one or more sides 416, 422, and/or any of the other geofence features or components noted herein. The one or more nodes, segments, sides, and/or other components of the third geofence 902 may, together, substantially enclose and/or otherwise define an internal area 908 of the third geofence 902, similar to the internal area 432 described above with respect to at least FIG. 4. In some examples, one or more of the nodes, segments, sides, and/or other components of the third geofence 902 (e.g., the nodes 702, 614, 424, etc.) may be substantially similar to and/or the same as the corresponding nodes, segments, sides, and/or other components of the geofences caused to be displayed at 332 (e.g., the updated geofence 706 and the second geofence 802 shown in the example user interface 800 of FIG. 8).

Additionally or alternatively, one or more of the nodes, segments, sides, and/or other components of the third geofence 902 (e.g., the segments 904, 906) may be generated by the controller 130 at 338 as part of generating the third geofence 902, and such components of the third geofence 902 may not have been previously included in, for example, the geofences caused to be displayed at 332. Such additional and/or new components (e.g., the segments 904, 906) of the third geofence 902 may, for example, link the respective internal areas of the geofences caused to be displayed at 332 (e.g., the internal areas 717, 809) such that the third geofence 902 generated at 338 is characterized by a single internal area 908 including at least part of, for example, the internal area 717 and the internal area 809. For instance, with reference to the example third geofence 902 illustrated in FIG. 9, at 338 the controller 130 may generate the segment 904 extending from the node 614 of the updated geofence 706 (FIG. 8) to the node 804 of the second geofence 802 (FIG. 8). Similarly, at 338 the controller 130 may generate the segment 906 extending from the node 424 of the updated geofence 706 (FIG. 8) to the node 806 of the second geofence 802 (FIG. 8). At 338, the controller 130 may also delete, for example, the segment 708 of the updated geofence 706 (FIG. 8) and the segment 808 of the second geofence 802 (FIG. 8). Such additions and deletions may be determined by the controller 130 at 338 so as to generate a third geofence 902 while modifying or deleting as few components as possible (and/or by making the smallest modifications possible) from the updated geofence 706 and the second geofence 802. As shown in FIG. 9, the third geofence 902 includes the new segments 904, 906, but does not include the segments 708, 808. By this process at 338, and in any of the examples described herein, the internal area 908 of the third geofence 902 is less than or equal to a sum of the internal area 717 and the internal area 809.

As noted above, in some examples it may be desirable for the controller 130 to combine the updated geofence 706 with the second geofence 802 such that machines performing tasks on the work surface 102 may be configured and/or otherwise permitted to traverse portions of the work surface 102 located or otherwise disposed within either the internal area 717 of the updated geofence 706 or the internal area 809 of the second geofence 802. In such examples, and as noted above, generating the third geofence at 338 may comprise combining, at least in part, the updated geofence 706 with the second geofence 802. Further, in any of the examples described herein and as illustrated in FIG. 9, at 338 the controller 130 may cause the display of the control interface 122 to display the third geofence 902 for consumption by an operator of the compaction machine 100. From 338, the controller may proceed to 330.

At 336, the controller 130 may also compare the locations, dimensions, widths, radii, and/or other configurations of the third geofence 902 with one or more sets of geofence creation rules to confirm that each of the machines present at the worksite 103 is able to safely perform one or more tasks within the internal area 908 of the third geofence 902. For example, such rules may include minimum required curvature dimensions (e.g., minimum radii) applicable to corners or other portions of a geofence to permit compaction machines, haul trucks, pavers, excavators and/or other such machines to turn, reverse course, and/or otherwise maneuver within the geofence. Such rules may also include minimum required widths between sides, nodes, segments, and/or other components of the geofence to permit one or more of the machines described herein to maneuver within the geofence during performance of one or more tasks on the work surface 102. Such an example width 910 is illustrated with respect to the portion 912 of the third geofence 902. As shown in FIG. 9, an example width may extend from a first segment (e.g., new segment 904) of the geofence to a second segment (e.g., new segment 906) of the geofence. In such examples, if the controller 130 determines that the third geofence 902 does not satisfy any such rules, the controller 130 may cause the display of the control interface 122 to display one or more of text, a pop-up window, a request icon, an alert, a notification, and/or other user interface component indicating that at least part of the third geofence (e.g., the portion 912) should be modified before one or more tasks can be safely performed within the internal area 908. In such examples, the operator may be prompted to modify the third geofence 902 using, for example, one or more of the tools 602, 604 so that such rules can be satisfied. Further, in some examples, such rules-based comparisons and/or determinations may be made by the controller 130 at, for example, 336 as part of the determination as to whether such a third geofence 902 is to be generated.

At 330, and based on the third geofence 902 generated at 338 (e.g., based on determining, at 336, that the third geofence 902 is to be generated), the controller 130 may cause, for example, the compaction machine 100 to perform one or more tasks on the work surface 102 within the internal area 908 defined by the third geofence 902. In such examples, at 330, the controller 130 may cause the compaction machine 100 to, for example, perform a task on the work surface 102 (e.g., a compaction task) using the drum 106, and within the internal area 908 of the third geofence 902. Alternatively, and as illustrated in FIG. 3, if the controller 130 determines, at 324 that at least part of the current geofence (e.g., the first geofence 414, the updated geofence 706, etc.) is greater than or equal to the example threshold distance from the second geofence 802 discussed above with respect to at least FIG. 8 (324—No), the controller 130 may cause, at 330, the compaction machine 100 to perform one or more tasks on the work surface 102 within the internal area defined by the current geofence (e.g., within the internal area 432 of the first geofence 414 or within the internal area 717 of the updated geofence 706). In such examples, at 330, the controller 130 may cause the compaction machine 100 to, for example, perform a task on the work surface 102 (e.g., a compaction task) using the drum 106, and within the internal area 432 of the first geofence 414 or within the internal area 717 of the updated geofence 706.

INDUSTRIAL APPLICABILITY

The present disclosure provides systems and methods for generating a geofence that substantially overlays a perimeter of a portion of a work surface. In such examples, the geofence defines an internal area within which a heavy duty machine, such as a compaction machine, a paving machine, a haul truck, an excavator, a dozer, and/or other such machine is permitted to maneuver and/or otherwise perform a task on the work surface. Such systems and methods may be used to designate a compaction area at a work site. In particular, such systems and methods may enable the operator of one or more machines to easily establish and/or modify the geofences described above such that the accuracy of the geofences (e.g., the accuracy of the location and/or configuration of such geofences) can be maximized before or during performance of various tasks on the work surface, and errors resulting from the inaccurate or out-of-date designation of permitted work areas can be avoided. Additionally, the systems and methods described herein enable the automated combination of one or more geofences based on the distance between one or more components of such geofences. As a result, the systems and methods described herein minimize the effort required by the operator to perform such geofence creation/combination analyses, and thus, improve operator and worksite efficiency.

As noted above with respect to FIGS. 1-9, an example method 300 of generating one or more geofences using the various systems described herein includes receiving information indicative of a perimeter of a first portion of a work surface 102. Such information can include, for example, coordinate information or other location information indicating a perimeter of the portion of the work surface 102 within which a task is to be performed by, for example, a compaction machine 100. The example method 300 also includes generating, based on such information, a first geofence 414 substantially overlaying the perimeter and defining a first internal area 432 within which the task noted above is to be performed, and within which the compaction machine 100 is permitted to operate. The example method 300 also includes causing a display, such as a display of a control interface 122 of the compaction machine 100, to display the first geofence 414. The example method 300 further includes receiving, based on displaying the first geofence 414, a first input indicating an accuracy of the first geofence 414. Such an input may comprise, for example, a touch input received via one or more icons 438, 440, controls, data fields, or other components of a user interface 400 presented by the display. The example method 300 also includes determining that at least part of the first geofence 414 (or, in some examples, at least part of an updated geofence 706 generated based on the first geofence 414) is less than a threshold distance from a second geofence 802 associated with the work surface 102, the second geofence 802 defining a second internal area 809. Additionally, the example method 300 includes generating, based on determining that the at least part of the first geofence 414 (or at least part of the updated geofence 706 noted above) is less than the threshold distance from the second geofence 802, a third geofence 902 associated with the work surface 102. In some examples, the third geofence 902 includes at least part of the first internal area 432 of the first geofence 414 and at least part of the second internal area 809 of the second geofence 802. In other examples, the third geofence 902 defines an internal area 908 including at least part of the internal area 717 of the updated geofence 706 and at least part of the second internal area 809 of the second geofence 802.

While aspects of the present disclosure have been particularly shown and described with reference to the examples above, it will be understood by those skilled in the art that various additional examples may be contemplated by the modification of the disclosed machines, systems and methods without departing from the spirit and scope of what is disclosed. Such examples should be understood to fall within the scope of the present disclosure as determined based upon the claims and any equivalents thereof.

What is claimed is:

1. A method, comprising:
   receiving information indicative of a perimeter of a first portion of a work surface;
   generating, based on the information, a first geofence substantially overlaying the perimeter, the first geofence defining a first internal area;
   causing a display to display the first geofence;
   receiving, based on displaying the first geofence, a first input indicating an accuracy of the first geofence;
   determining that at least part of the first geofence is less than a threshold distance from a second geofence associated with the work surface, the second geofence defining a second internal area; and
   generating, based on determining that the at least part of the first geofence is less than the threshold distance from the second geofence, a third geofence associated with the work surface, the third geofence including at least part of the first internal area and at least part of the second internal area.

2. The method of claim 1, wherein the information includes coordinate information determined by a location sensor carried by a machine disposed on the work surface.

3. The method of claim 1, wherein the first input indicates that the first geofence is inaccurate, and the information comprises first information, the method further comprising receiving second information indicative of a modification to the first geofence.

4. The method of claim 3, further comprising:
   determining, based on the second information, that the modification extends beyond a boundary of the first geofence; and
   based on determining that the modification extends beyond the boundary of the first geofence, causing the display to display a notification corresponding to the modification.

5. The method of claim 4, further comprising:
   receiving, based on displaying the notification, a second input; and
   updating the first geofence, based on the second input, in accordance with the second information.

6. The method of claim 1, wherein the at least part of the first geofence comprises a node of the first geofence, a segment of the first geofence, or a side of the first geofence.

7. The method of claim 1, further comprising:
   causing, based on determining that the at least part of the first geofence is less than the threshold distance from the second geofence, the display to display the first geofence together with the second geofence; and
   causing the display to display a request for a confirmation associated with generating the third geofence.

8. The method of claim 7, further comprising:
   receiving, based on displaying the request, a second input; and
   generating the third geofence based on the second input.

9. The method of claim 1, wherein determining that the at least part of the first geofence is less than the threshold distance from the second geofence comprises determining that the at least part of the first geofence overlays at least part of the second geofence.

10. The method of claim 1, wherein generating the third geofence comprises generating a geofence segment extending from the first geofence to the second geofence, the third geofence including the geofence segment.

11. A system, comprising:
    a location sensor configured to determine a location of a machine on a work surface;
    a display; and
    a controller in communication with the location sensor and the display, the controller configured to:
    receive location information determined by the location sensor, the location information being indicative of a perimeter of a first portion of the work surface;
    generate, based on the location information, a first geofence substantially overlaying the perimeter, the first geofence defining a first internal area;
    cause the display to display the first geofence;
    receive, based on displaying the first geofence, a first input indicating an accuracy of the first geofence;
    determine that at least part of the first geofence is less than a threshold distance from a second geofence associated with the work surface, the second geofence defining a second internal area; and
    generate, based on determining that the at least part of the first geofence is less than the threshold distance from the second geofence, a third geofence associated with the work surface, the third geofence including at least part of the first internal area and at least part of the second internal area.

12. The system of claim 11, wherein the location sensor and the display are carried by the machine, the machine comprises a compaction machine, and the first input is received via the display.

13. The system of claim 11, wherein the controller is configured to:
    receive the location information and the first input via a network, and
    provide the third geofence to a controller of the machine via the network.

14. The system of claim 11, wherein the third geofence defines a third internal area that is less than or equal to a sum of the first internal area and the second internal area.

15. The system of claim 11, wherein the controller is further configured to:
    cause, based on determining that the at least part of the first geofence is less than the threshold distance from the second geofence, the display to display the first geofence together with the second geofence;
    cause the display to display a request for a confirmation associated with generating the third geofence;
    receive, based on displaying the request, a second input; and
    generate the third geofence based on the second input.

16. A compaction machine, comprising:
    a substantially cylindrical drum configured to compact a work surface as the compaction machine traverses the work surface;
    a location sensor configured to determine a location of the compaction machine on the work surface;
    a display; and
    a controller in communication with the location sensor and the display, the controller configured to:
    cause the display to display a first geofence associated with the work surface, the first geofence defining a first internal area and being generated based on location information determined by the location sensor;
    receive, based on displaying the first geofence, a first input indicating an accuracy of the first geofence;
    determine that at least part of the first geofence is less than a threshold distance from a second geofence associated with the work surface, the second geofence defining a second internal area;

generate, based on determining that the at least part of the first geofence is less than the threshold distance from the second geofence, a third geofence associated with the work surface, the third geofence including at least part of the first internal area and at least part of the second internal area; and cause the compaction machine to perform a task on the work surface, using the drum, and within the third geofence.

17. The compaction machine of claim 16, further comprising a communication device in communication with the controller, the controller being configured to receive information indicative of the first geofence, via the communication device, and from a remote computing device.

18. The compaction machine of claim 16, wherein the first input indicates that the first geofence is inaccurate, and the information comprises first information, the controller being configured to:

receive second information, via the display, indicative of a modification to the first geofence; and update the first geofence in accordance with the second information.

19. The compaction machine of claim 18, wherein the controller is configured to:

determine that the modification to the first geofence does not extend beyond a boundary of the first geofence; and update the first geofence, in accordance with the second information, based on determining that the modification does not extend beyond the boundary.

20. The compaction machine of claim 16, wherein the controller is further configured to:

cause, based on determining that the at least part of the first geofence is less than the threshold distance from the second geofence, the display to display a request for a confirmation associated with generating the third geofence;

receive, based on displaying the request, a second input; and generate the third geofence based on the second input.

* * * * *